United States Patent
Felisatti et al.

(10) Patent No.: US 11,321,226 B2
(45) Date of Patent: May 3, 2022

(54) JOINT VALIDATION ACROSS CODE REPOSITORIES

(71) Applicant: salesforce.com, inc., San Francisco, CA (US)

(72) Inventors: Ana Laura Felisatti, Buenos Aires (AR); Pablo Damian La Greca, Buenos Aires (AR); Maria Eugenia Mariotti, Buenos Aires (AR)

(73) Assignee: salesforce.com, inc., San Francisco, CA (US)

( * ) Notice: Subject to any disclaimer, the term of this patent is extended or adjusted under 35 U.S.C. 154(b) by 218 days.

(21) Appl. No.: 16/711,365

(22) Filed: Dec. 11, 2019

(65) Prior Publication Data
US 2021/0182182 A1    Jun. 17, 2021

(51) Int. Cl.
*G06F 9/44* (2018.01)
*G06F 11/36* (2006.01)
*G06F 40/20* (2020.01)

(52) U.S. Cl.
CPC ...... *G06F 11/3684* (2013.01); *G06F 11/3688* (2013.01); *G06F 11/3692* (2013.01); *G06F 40/20* (2020.01)

(58) Field of Classification Search
CPC ............. G06F 11/3684; G06F 11/3688; G06F 11/3692; G06F 40/20
See application file for complete search history.

(56) References Cited

U.S. PATENT DOCUMENTS

| | | | | |
|---|---|---|---|---|
| 2013/0326480 A1* | 12/2013 | Clemm | ...................... | G06F 8/71 717/122 |
| 2017/0277534 A1* | 9/2017 | Mallisetty | .................. | G06F 8/77 |
| 2018/0321918 A1* | 11/2018 | McClory | ............. | H04L 63/0281 |
| 2018/0357062 A1* | 12/2018 | Chichkov | ................. | G06F 8/71 |
| 2019/0294531 A1* | 9/2019 | Avisror | ............... | G06F 11/3676 |
| 2020/0348921 A1* | 11/2020 | Marechal | ............ | G06F 11/3672 |

* cited by examiner

*Primary Examiner* — Chat C Do
*Assistant Examiner* — Lenin Paulino
(74) *Attorney, Agent, or Firm* — Holland & Hart LLP

(57) ABSTRACT

Methods, systems, and devices supporting joint code validation across code repositories are described. Some systems may store code across multiple code repositories, where the code repositories support repository-specific pull requests and validations. However, code stored in one repository may depend on code stored in a different repository. To accurately validate changes to such code, a system may identify a validation trigger for a first pull request (e.g., indicating one or more code changes to a first code repository), determine a second code repository or second pull request related to the first pull request, and generate a test build across the code repositories. For example, the test build may include code updates in the first code repository according to the first pull request and code from the second code repository (e.g., updated according to the second pull request). The system may perform joint validation tests on the test build.

16 Claims, 13 Drawing Sheets

JOINT VALIDATION ACROSS CODE REPOSITORIES

FIELD OF TECHNOLOGY

The present disclosure relates generally to database systems and data processing, and more specifically to joint validation across code repositories.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some systems, a software development platform may support a user developing a software application. For example, the software development platform may store code for users, organizations, or both in code repositories. Depending on the size of the codebase stored for a user or an organization, the software development platform may divide the code amongst multiple code repositories. However, the code repositories may function as separate entities in the software development platform. As such, if a user modifies code in one code repository—and this code depends on the user's code stored in a separate repository—the software development platform may fail to accurately validate the modified code.

DETAILED DESCRIPTION

Figure 1:
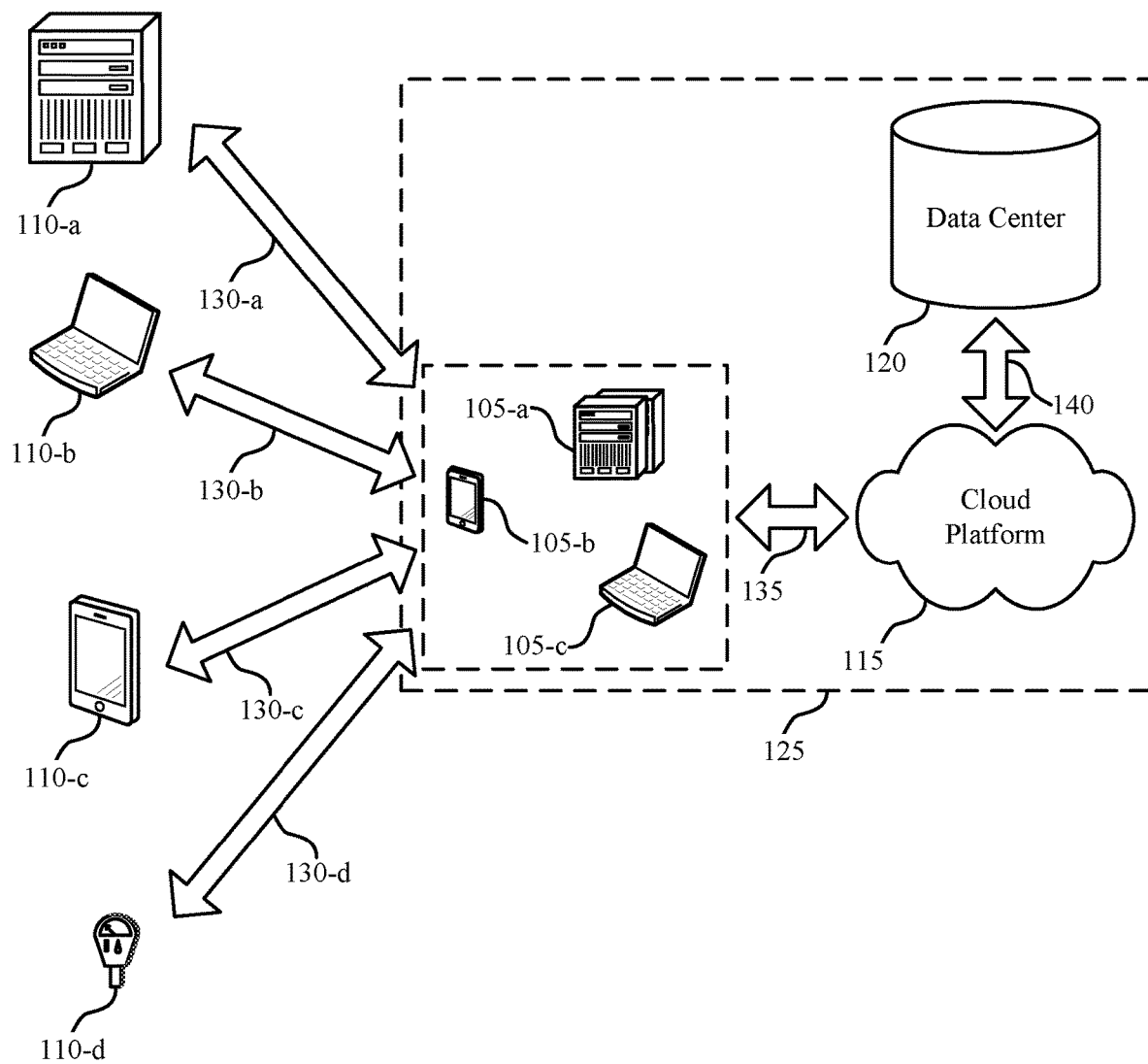
FIG. 1 illustrates an example of a system that supports joint validation across code repositories in accordance with aspects of the present disclosure.

In some systems, a software development platform (e.g., GitHub) may support users developing code for software applications. The software development platform may store code for users, organizations, or both in code repositories. Depending on the size of the codebase stored for a user or an organization, the software development platform may divide the code amongst multiple code repositories. For example, if an organization maintains a relatively large codebase (e.g., above some threshold size), the code may be divided into multiple code repositories due to code repository limits, server limits, latency issues associated with large code repository sizes, the organization's structure, or a combination thereof. These different code repositories may function as separate entities in the software development platform. For example, the software development platform may support repository-specific pull requests and validations for updating code in a repository, where a pull request may be an indication of proposed changes to a particular code repository for review and/or validation. As such, if a user modifies code in one code repository (e.g., a first repository) that depends on the user's code stored in a different code repository (e.g., a second repository), the software development platform may fail to accurately validate the modified code. For example, running a validation on the first repository may result in false positives (e.g., if a code update breaks code in another repository but not the first repository) or false negatives (e.g., if the code update breaks in the first repository due to the validation not taking into account a correlated code update in a second repository).

To support code updates in systems with multiple interdependent code repositories, a software development platform may implement joint validation across code repositories. Joint validation may involve identifying correlated code repositories, pull requests, or both when validating a pull request. Rather than testing code updates in the code repository indicated by the pull request independent of other related code repositories, the system may generate a test build of code based on the current states of multiple code repositories according to correlated pull requests. For example, to validate a pull request, the system may determine the current state of all correlated repositories, update the current states based on all correlated pull requests to obtain a test build (e.g., in a test code environment), and run validation tests on the test build. If one or more validation tests fail for the test build, the system may refrain from merging the code updates indicated by the correlated pull requests into the code repositories and may surface a report to a user indicating the failed validation(s).

In some implementations, the system may correlate pull requests across code repositories based on the names of the pull requests, a natural language processing (NLP) analysis of the pull requests, or some combination thereof. For example, upon identifying a validation trigger for an open pull request indicating a particular code branch, the system may identify all currently open pull requests across multiple code repositories (e.g., all code repositories, code repositories storing code for a particular user or organization, etc.)

that share the same branch name as the particular code branch in the triggered pull request. An application server may generate a unique build using all of the identified pull requests to jointly validate the code updates across the code repositories.

The software development platform may manage code updates based on the result of the joint validation. For example, the software development platform may block the merging of branches until a pull request for a particular branch is successfully validated. Based on the joint validation, even if the validation of a pull request is successful in one code repository, the platform may block merging the branch in that code repository based on the validation failing in another code repository. If the validation is successful across all of the correlated code repositories (e.g., for all of the correlated pull requests), the platform may merge the branches with the base branches in the code repositories to effectively push the code updates.

Aspects of the disclosure are initially described in the context of an environment supporting an on-demand database service. Additional aspects of the disclosure are described with reference to systems, procedures, and architectures supporting joint validation across code repositories. Aspects of the disclosure are further illustrated by and described with reference to apparatus diagrams, system diagrams, and flowcharts that relate to joint validation across code repositories.

FIG. 1 illustrates an example of a system 100 that supports joint validation across code repositories in accordance with aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135 and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

Some systems, such as the system 100, may store code across multiple code repositories. For example, the cloud platform 115, data center 120, or both may support a software development platform. The software development platform may include multiple code repositories, where the code repositories support repository-specific pull requests and validations. However, in some cases, code stored in one code repository may depend on code stored in a different code repository. For example, the system 100 may store code for a cloud client 105 (e.g., a particular user or organization) across multiple code repositories based on repository limits, server limits, latency specifications, or a combination thereof. In some examples, the code for the cloud client 105 stored in one code repository may depend on code for the cloud client 105 stored in a different code repository (e.g., based on one or more code dependencies defined in the code).

To accurately validate changes to such code, the system 100 (e.g., a server of the system 100, such as an application server, a cloud-based server, a database server, a server cluster, a virtual machine, a container, or some combination of these or other devices or systems supporting information processing) may support joint validation across the interdependent code repositories. For example, the system 100 may identify a validation trigger for a first pull request (e.g., indicating one or more code changes to a first code repository), determine a second code repository or second pull request related to the first pull request, and generate a test build across the code repositories. The test build may include code updates in the first code repository according to the first pull request and code from the second code repository, where the code from the second code repository may also be updated if the system 100 identifies a second pull request related to the first pull request. The system 100 may perform one or more joint validation tests on the generated test build and may merge the pull request(s) (e.g., apply the code updates to the code repositories) if the joint validation passes across the code repositories.

In some other systems, each code repository may handle validations independently. For example, because pull requests are repository-specific, other systems may apply the code updates indicated by a pull request to the code in a repository and perform validation tests on the updated code. However, if the code in the repository depends on a portion of code stored in a different code repository (e.g., a second repository), these other systems may fail to accurately validate the modified code. For example, running a validation on a first repository may result in false positives (e.g., if a code update breaks code in another repository but not the first repository) or false negatives (e.g., if the code update breaks in the first repository due to the validation not taking into account a correlated code update for another repository). As such, these other systems may merge code updates that cause code in another repository to break (e.g., resulting in issues with keeping code accurate and running) or may block the merging of a code update that is valid based on code in another repository (e.g., resulting in latency issues associated with updating code).

In contrast, the system 100 may perform joint validation across code repositories. For example, the system 100 may identify correlated pull requests across code repositories (e.g., based on shared branch names between the pull requests) and may perform joint validation for these correlated pull requests (e.g., in a testing environment). By performing validation tests against a test build generated using all of the correlated pull requests, the system 100 may accurately determine if a code update in one code repository will break code in another related code repository. The system 100 may block code updates that do not pass joint validation and may merge code updates in each of the related code repositories if the joint validation passes for all of the code repositories. This joint validation process may support accurate validation of code in systems 100 with multiple, inter-dependent code repositories, such that accurate code may be maintained throughout low latency code updates.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
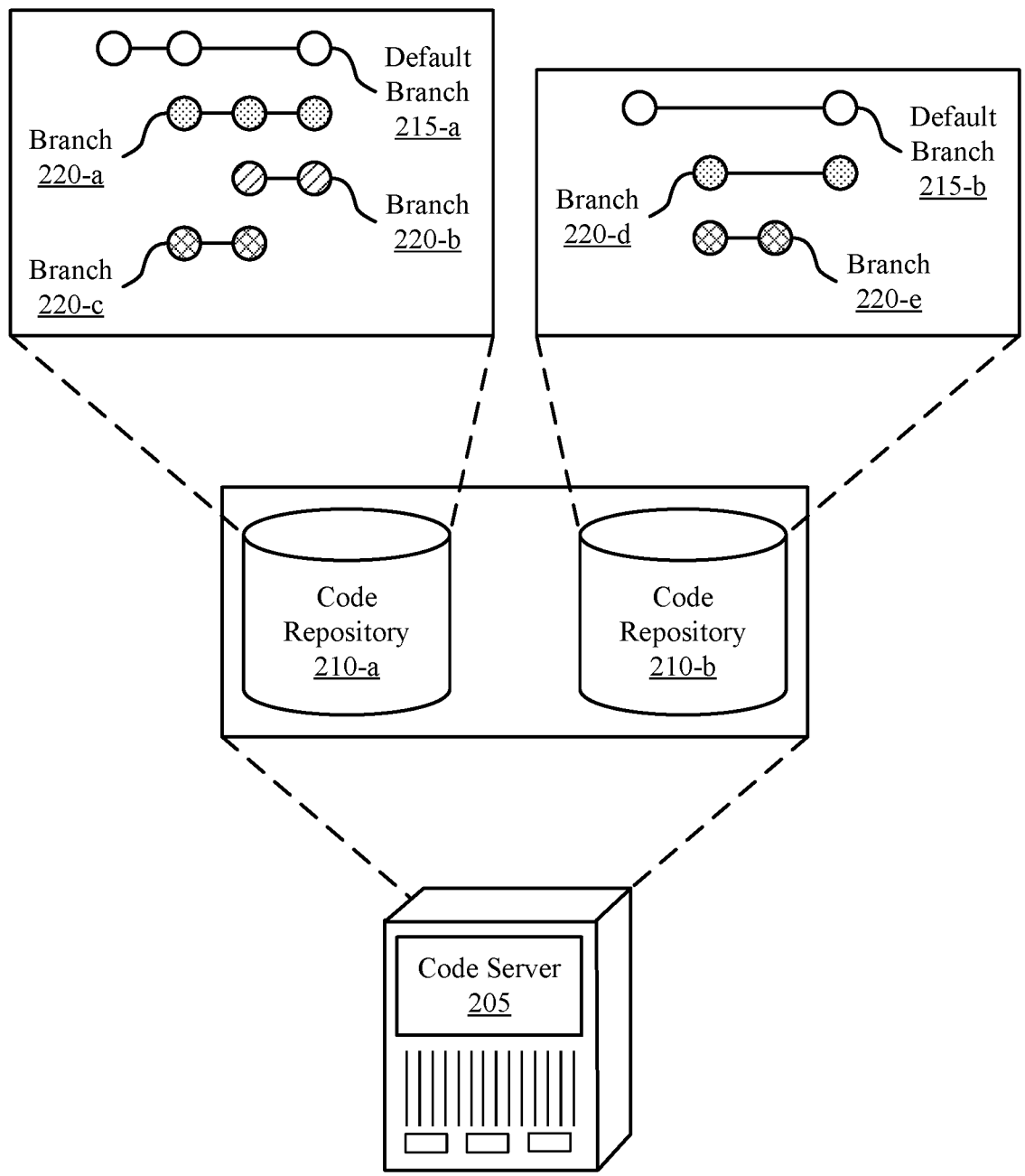
FIG. 2 illustrates an example of a software development platform code storage architecture that supports joint validation across code repositories in accordance with aspects of the present disclosure.

FIG. 2 illustrates an example of a software development platform code storage architecture 200 that supports joint validation across code repositories in accordance with aspects of the present disclosure. FIG. 2 illustrates an example architecture for storing versioned code. The software development platform code storage architecture 200 may include a code server 205 containing or otherwise supporting multiple code repositories 210. The code server 205 may be an example of a Git server, a group of Git servers, an application server, a server cluster, a virtual machine, a container, or any combination of these or other devices or systems supporting code storage. Each code repository 210 may support a number of branches, including a default branch 215. The default branch 215 may include currently active code (e.g., a production version of code) or a baseline version of code, while the other branches 220 may include other versions of code (e.g., code currently being modified and/or validated by users). Each code repository 210 may support one or more users or organizations, where a single user or organization may store code across multiple code repositories 210. The code server 205 may be a component of a subsystem 125 as described with reference to FIG. 1.

The code server 205 may include code repository 210-*a* and code repository 210-*b*. Each code repository 210 may be a file storage system for multiple versions of files (e.g., multiple versions of code). A code repository 210 may include a trunk (e.g., the current version of a software project, such as a version in production) and branches 220 (e.g., including new or different versions of the software project or portions of the software project). In some cases, the trunk may include a default branch 215 or base branch of the code. Each branch may include one or more source code files, resources, or both supporting one or more versions of the software project. As illustrated, code repository 210-*a* may include default branch 215-*a* and branches 220-*a*, 220-*b*, and 220-*c*. Code repository 210-*b* may include default branch 215-*b* and branches 220-*d* and 220-*e*. A user may create a new branch 220 to revise a portion of the software project. If the new branch 220 is submitted and validated (e.g., using a pull request), the code server 205 may merge the new branch 220 into the default branch 215 (e.g., the base branch, the trunk, etc.). This merged version of the code may become the latest version of the software project. Each code repository 210 may support one or more software projects for one or more users or organizations.

In some cases, users may define correlated branches 220 across code repositories. For example, the code of one or more software projects for an organization (e.g., a tenant of a multi-tenant database system) may span multiple code repositories, where one or more portions of code in a first code repository 210-*a* depend on one or more portions of code in a second code repository 210-*b*. A user may correlate code updates across code repositories 210 using naming conventions for branches 220. For example, the user may name branch 220-*a* with the same name as branch 220-*d*. Accordingly, to merge branch 220-*a* into default branch 215-*a*, code server 205 or a related server may perform a joint validation on branch 220-*a* in code repository 210-*a* and branch 220-*d* in code repository 210-*b*. If the joint validation passes for both branches, the code server 205 may merge branch 220-*a* with default branch 215-*a* and branch 220-*d* with default branch 215-*b*. If the joint validation fails for either branch 220-*a* or 220-*d*, the code server 205 or a related server may block merging both of these branches 220. For example, if validation of branch 220-*d* fails, but validation of branch 220-*a* passes during the joint validation, pull requests for both branches 220-*a* and 220-*d* may be assigned a failure result and the code server 205 may be blocked from merging branch 220-*a* with default branch 215-*a* (e.g., despite the validation passing for this branch 220-*a*).

Figure 3:
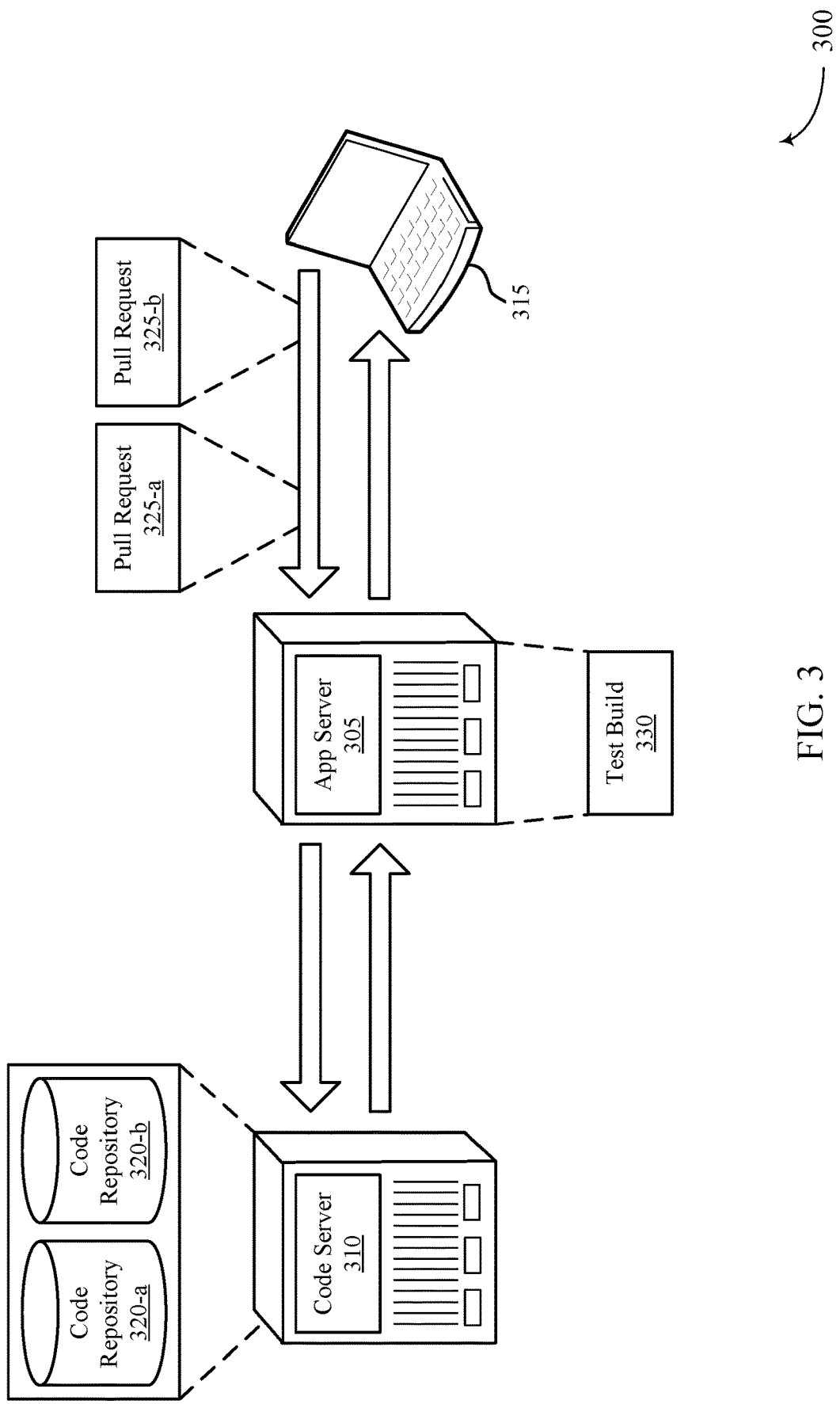
FIGS. 3 and 4 illustrate examples of systems that support joint validation across code repositories in accordance with aspects of the present disclosure.

FIG. 3 illustrates an example of a system 300 that supports joint validation across code repositories in accordance with aspects of the present disclosure. The system 300 may include an application server 305 for joint validation and a code server 310 containing or supporting multiple code repositories 320. The application server 305, code server 310, or both may be examples of single servers, server clusters, database servers, cloud-based servers, virtual machines, containers, or some combination of these or any other devices or systems for processing data. The application server 305 and code server 310 may be examples or components of a subsystem 125 as described with reference to FIG. 1. For example, the code server 310 may be an example of a code server 205 as described with reference to FIG. 2. A user device 315, such as a cloud client 105 or contact 110 as described with reference to FIG. 1, may communicate with the application server 305, the code server 310, or both. For example, a user of the user device 315 may develop code updates, input pull requests, trigger code validations, or some combination thereof for the system 300.

In some software development systems, such as the system 300, a software project may be divided into multiple code repositories 320, where one code repository (e.g., code repository 320-a) may be dependent on another code repository (e.g., code repository 320-b). However, a code server 310 (e.g., supporting one or more code repositories 320, storing one or more code repositories 320, etc.) may perform repository-based software validations. Such "single repository validations" may result in inaccurate validation results when separate code repositories 320 are inter-dependent. For example, a single repository validation for code repository 320-a may not take into account a proposed code change for code repository 320-b, leading to a false negative (i.e., a validation that fails when it would succeed according to a dependence on another repository). Additionally, a single repository validation for code repository 320-a may not identify broken code in code repository 320-b, leading to a false positive (i.e., a validation that succeeds when it would fail based on code in another repository).

To accurately validate software that is split across multiple code repositories 320, the system 300 may support cross-repository validation. The system 300 may correlate code changes across code repositories 320 that correspond to a single change (e.g., a single code fix, a single update that affects multiple code repositories 320, etc.). The system 300 may support joint validation for any platform storing a single piece of software across multiple separate code storage systems. For example, the code server 310 may be an example of one or more Git servers for GitHub, and the code for a single piece of software may be stored by the one or more Git servers across multiple code repositories 320. The system 300 may efficiently support frequent updates to the code repositories 320 using joint validation.

To perform joint validation, the application server 305, the code server 310, or both may monitor for pull requests 325 in each code repository 320. A pull request 325 may indicate a code update (e.g., a code update defined in a particular branch of code) to merge into another version of code, such as a production version of code (e.g., a default branch for a code repository 320 as described with reference to FIG. 2). For example, a user operating a user device 315 may open a pull request 325 for a code update. Other users with sufficient permissions (e.g., users of the same organization) may view the open pull request 325, add additional code changes, update the code changes, or some combination thereof before the code changes are merged with other code in the code repository 320.

The application server 305 may correlate pull requests 325 across code repositories 320 to support validating updates that span across multiple code repositories 320. In some cases, correlated changes in each code repository 320 may share a same branch name. For example, a user operating the user device 315 may create a code branch in code repository 320-a defining a set of updates in code repository 320-a. However, in some cases, a portion of code in code repository 320-b may be dependent on the updates in code repository 320-a and may break based on the updates without a corresponding set of updates in code repository 320-b. As such, the user may additionally create a code branch in code repository 320-b defining a second set of updates in code repository 320-b. The user may include information indicating the correlation between these code branches. For example, the user may name these code branches with the same branch name. In other examples, the code server 310 or application server 305 may automatically determine the correlation between these code branches (e.g., based on the dependencies in the code) and may generate an indication of the correlation between the code branches. The user may create a first pull request 325-a for the code branch in code repository 320-a and a second pull request 325-b for the correlated code branch in code repository 320-b.

To validate these separate pull requests 325 for separate branches in separate code repositories 320, the application server 305 may run a single validation process. If the application server 305 identifies a validation trigger for either of the pull requests 325 (e.g., based on approval of a pull request 325), the application server 305 may additionally identify the correlated pull request 325. The application server 305 may add the correlated code from the multiple code repositories 320 into a single unit (e.g., a test build 330) and may validate the single unit of code. For example, the application server 305 may generate the test build 330 by retrieving a current repository state for both code repository 320-a and code repository 320-b and by applying the correlated changes indicated by both pull request 325-a and pull request 325-b. In some cases, the application server 305 may retrieve the code by copying or cloning the relevant branches indicated by the pull requests 325. For example, each pull request 325 indicates a head branch—containing the code updates to apply—and a base branch—containing the code that is to be updated. The application server 305 may build the test build 330 using both the head branch and base branch stored in code repository 320-a and indicated by pull request 325-a and the head branch and base branch stored in code repository 320-b and indicated by pull request 325-b.

The application server 305 may run a set of validation tests on the test build 330. For example, the application server 305 may test whether the code in the test build 330 compiles. Additionally or alternatively, the application server 305 may input one or more test cases (e.g., edge cases, baseline cases, etc.) to check whether the code in the test build 330 does not break and results in the expected outcome. Furthermore, the application server 305 may test for dependency discrepancies, typos, inefficiencies, security risks, or any combination thereof. In some examples, the application server 305 may run a full set of validation tests for the joint validation. In some other examples, the application server 305 may run a subset of validation tests for the joint validation (e.g., based on the relevant code repositories 320, the user, a user input, or some combination thereof). The application server 305 may determine a validation result for the test build 330 (e.g., a validation result for both of the correlated pull requests 325-a and 325-b) based on the set of validation tests.

The application server 305 may generate a full report for the joint validation based on the validation result. The full report may include information relevant to multiple code repositories 320 (e.g., as opposed to a repository-specific validation report). The full report may indicate "success," "failure," or "unstable" for the joint validation of the test build 330. If the validation succeeds, the application server 305 may merge the head branches with the base branches in code repositories 320-a and 320-b as indicated by the validated pull requests 325-a and 325-b. If the validation fails or the test build 330 is unstable, the application server 305 may block the code server 310 from merging the head branches with the base branches in code repositories 320-a and 320-b. A "failure" result may correspond to a test build 330 that fails to compile, while an "unstable" result may correspond to a test build 330 that compiles but fails one or more validation tests. In these cases, the full report may indicate which test(s) failed or which line(s) of code failed to compile (e.g., in which code repositories 320, branches, etc.). The application server 305 may transmit the full report to the user device 315 for display in a user interface. The user operating the user device 315 may identify the issues with the test build 330 and may revise the code updates (e.g., the head branches) in one or more of the code repositories 320 accordingly. By generating a full report, rather than one or more repository-specific reports, the application server 305 may indicate code that fails in a code repository 320 that doesn't correspond to a pull request 325 (but includes code that is dependent on other code updated based on a pull request 325).

The application server 305 may assign the validation results to the pull requests 325. For example, if the joint validation fails for even one code repository 320, the application server 305 may assign a failure result to each correlated pull request 325 (e.g., across all of the correlated code repositories 320). Users may view the validation results for the pull requests 325 in a user interface.

Figure 4:
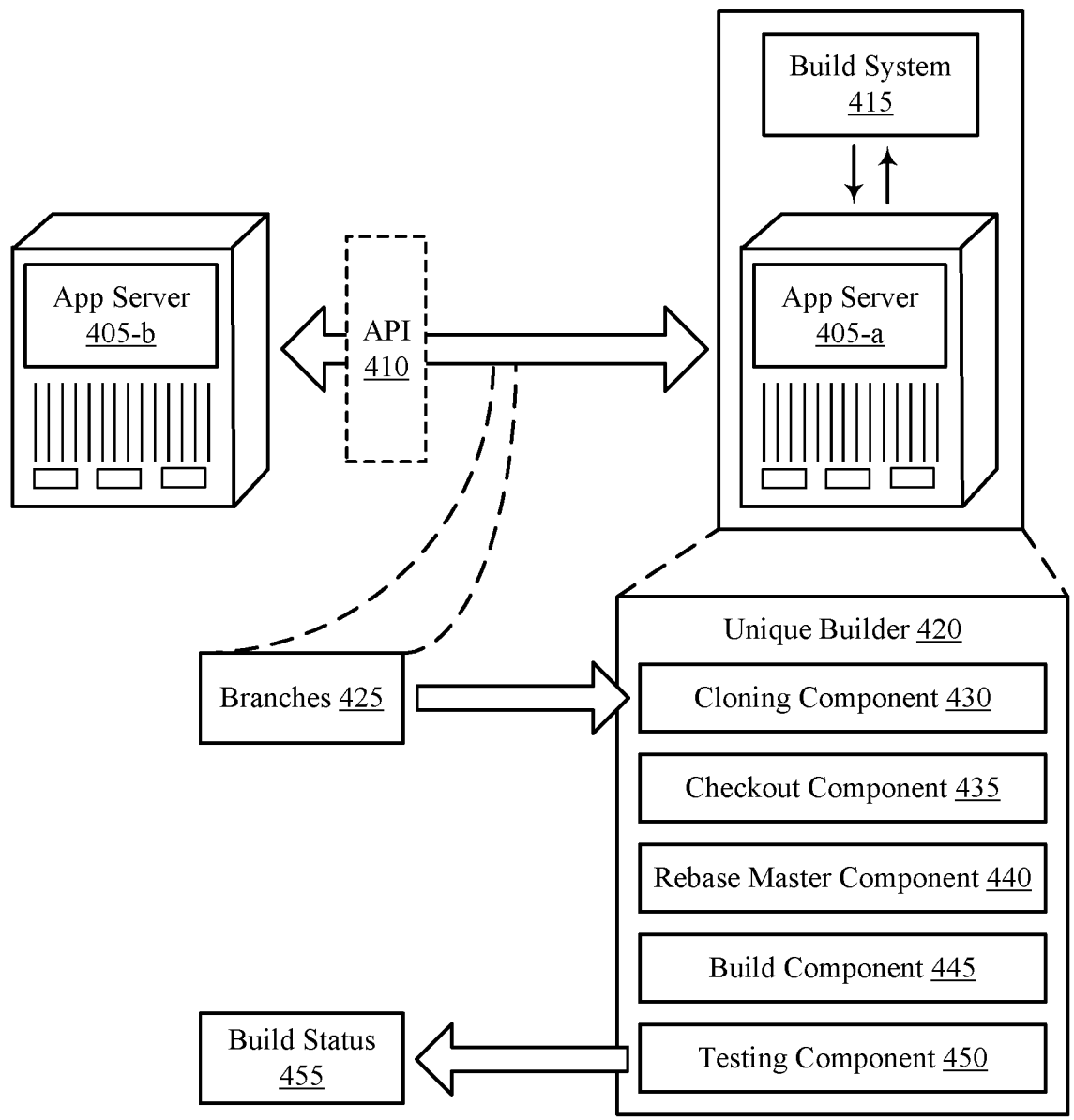

FIG. 4 illustrates an example of a system 400 that supports joint validation across code repositories in accordance with aspects of the present disclosure. The system 400 may support a multi-repository build validator. The system 400 may include an application server 405-a (e.g., associated with a continuous integration tool or build system 415) and an application server 405-b (e.g., a code server as described with reference to FIGS. 2 and 3). These application servers 405-a and 405-b may interact via an application programming interface (API) 410. For example, application server 405-a may retrieve code (e.g., copy instances or versions of code) from application server 405-b via the API 410. In some cases, the application server 405-b may support a GitHub application, and the API 410 may be an example of a representational state transfer (REST) API, such as REST API version 3 (v3). For example, the REST API may identify code changes in a codebase supported by application server 405-b.

The application server 405-a may support a tool that blocks merging code until a set of criteria is met. The set of criteria to meet may include a code update passing a set of tests (e.g., at least a minimum set of tests), the code update having a valid name, the pull request having a valid name (e.g., according to a pull request name validation application), or some combination thereof. The application server 405-a, build system 415, or a combination of the two may create a unique build (e.g., using a unique builder 420) for code changes associated with a specific issue across different code repositories (e.g., across multiple different artifacts). These code changes may be referred to as correlated changes. In some cases, the unique builder 420 may be an aspect of the build system 415, which may include a build plan for validation testing. The application server 405-a may detect which code changes result in build failures or test failures based on the unique builder 420. In some cases, the application server 405-a may support early detection of these failures by using the unique builder 420, as the system may detect failures across multiple code repositories without implementing any code changes in the codebase (e.g., at application server 405-b). This may allow the system 400 to mitigate setbacks based on improperly validated code changes and increase confidence in successfully merging code. For example, the system 400 may block the merging of code changes with the codebase if the code changes do not compile or do not comply with an initial set of tests.

The application server 405-a may support a set of validation tests (e.g., a minimum set of tests) to run for each pull request. These validation tests may be user-defined or pre-defined at the application server 405-a. The validation tests may include low latency tests (e.g., such that the tests do not significantly increase the average merge time) that catch common merging errors. The application server 405-a may support running a single validation build across multiple pull requests if each of the pull requests indicate correlated changes.

To support the joint validation, the application server 405-a may listen to (e.g., monitor for) pull requests received for a set of projects (e.g., software projects supported by the application server 405-b). The application server 405-a may trigger a validation build on a first pull request and may link all subsequent pull requests indicating correlated changes to the first pull request. In some cases, the application server 405-a may identify correlated changes based on the branches 425 for these correlated changes having the same name. The application server 405-a may use a validation process to block a merge for the code updates corresponding to any of the linked pull requests unless a build process for the linked pull requests is successful.

When a pull request is received by the application server 405-a, the application server 405-a may run an initial pull request format validation on the received pull request (e.g., independent of the linked pull requests). This initial pull request format validation may check to ensure that a pull request references a valid issue for a particular user or organization (e.g., based on whether the pull request is associated with a public code repository or a private code repository). However, even if a pull request passes this initial pull request format validation, the application server 405-a may set a status of the pull request to "failing" or "failure" until the full validation test is run, effectively blocking merging of the pull request until the full validation test is successful. To avoid performing a validation prior to submission of all of the correlated pull requests, the application server 405-a may refrain from performing a validation until a user inputs a "validate" comment on one or more of the correlated pull requests or until all linked pull requests are approved (e.g., by a different user than the author of the pull requests). Upon receiving one of these or a similar validation trigger, the application server 405-a may retrieve the code corresponding to all of the pull requests linked to the pull request with the validation trigger. In some cases, a user may repeat inputting a "validate" comment to re-run a validation process. For example, in case of a failure, a user could upload one or more new or revised commits and may repeat the validation process. The system 400 may receive a "validate" comment when all relevant branches 425 across code repositories are uploaded and all pull requests open for these branches 425. In some cases, the system 400 may identify if a pull request or branch is missing and may send a warning to a user to add the missing pull request or branch prior to joint validation.

The application server 405-a may perform a validation build using the unique builder 420. The validation build may involve the application server 405-a identifying all correlated code changes according to the linked pull requests, applying the changes to the master branches (e.g., simulating the merges) and leaving unchanged projects with their master branches, compiling across the master branches for the correlated projects, and running the set of validation tests on the compiled code. The application server 405-a may generate error messages for compilation failures, validation testing failures, or both, such that an error message identifies where a failure occurred in the corresponding pull request or branch.

In one example, when a validation trigger is identified (e.g., when a user comments with "validate" for a particular pull request or if all correlated, pending pull requests are approved), the unique builder 420 may run a test validation build. A cloning component 430 may clone the relevant project(s) from the application server 405-b. This may involve cloning the full project or the relevant branches 425 from the correlated code repositories. For example, if a linked pull request is identified for a code repository, the unique builder 420 may clone the master branch and the code updates indicated by the pull request. If no linked pull request is identified for a code repository containing relevant code, the unique builder 420 may clone the master branch. Additionally or alternatively, the unique builder 420 may support multiple base branches for one or more pull requests. The unique builder 420 may update all of the code to "master" versions by applying the code updates to the corresponding master branches. The checkout component 435 may checkout all possible submodules of the pull request branches. The rebase master component 440 may rebase all of the checked-out submodules. The build component 445 may compile the code—including the updated master branches and rebased submodules—to generate a test build. The testing component 450 may run one or more validation tests on the test build.

Based on the results of the validation tests, the unique builder 420 may determine a build status 455. The unique builder 420 may update the statuses of each of the linked pull requests (e.g., matching the same branch name) with the build status 455. In some examples, if the build fails one or more tests, the build status 455 may include a link indicating the portion of a branch 425 or pull request that caused the failure. Accordingly, a user viewing the build status 455 may check the details of the failure based on the link. If the build passes all of the tests, the application server 405-a may refrain from blocking the merging of the code updates—or may trigger the merging of the code updates—based on the successful validation. By using the joint validation and generating the test build, the application server 405-a may identify an exact state of the final software with the relevant changes applied and may ensure that the final software compiles and works (e.g., according to the validation tests).

The joint validation may include tests such as code coverage tests, code smell tests, environment validation tests, custom validation tests, code performance tests, or some combination of these or other validation tests. Additionally or alternatively, the application server 405-a may determine the tests to run based on the software projects, code repositories, or both related to the linked pull requests. In some cases, the joint validation may use a dependency graph to determine projects and/or code modules for testing.

The joint validation may not replace individual validations for pull requests, code updates, or both. For example, users may run tests locally for directly modified code modules. However, such tests may not account for potential issues during merging, especially for projects spanning multiple code repositories. Joint validation may provide validation testing for the merging. Additionally or alternatively, some code updates may not use the joint validation process. For example, if a user selects to cherry-pick a commit to be appended to a master branch, the system 400 may not perform a joint validation on the commit (e.g., as the user may be expected to perform a manual validation for cherry-picks). In other cases, however, the system 400 may perform a joint validation for cherry-picks as well. For example, the application server 405-a may automatically identify when cherry-picked changes are merged and can cherry-pick corresponding code for validation. The system 400 may refrain from pushing updated code until the cherry-picked validation is successful. This cherry-picked validation may automatically repeat once conflicts are resolved in the relevant branches (e.g., manually by a user). Furthermore, the system 400 may or may not perform joint validation for connectors. For example, in some cases, the application server 405-a may compile one or more connectors along with the code changes for the joint validation process.

Figure 5:
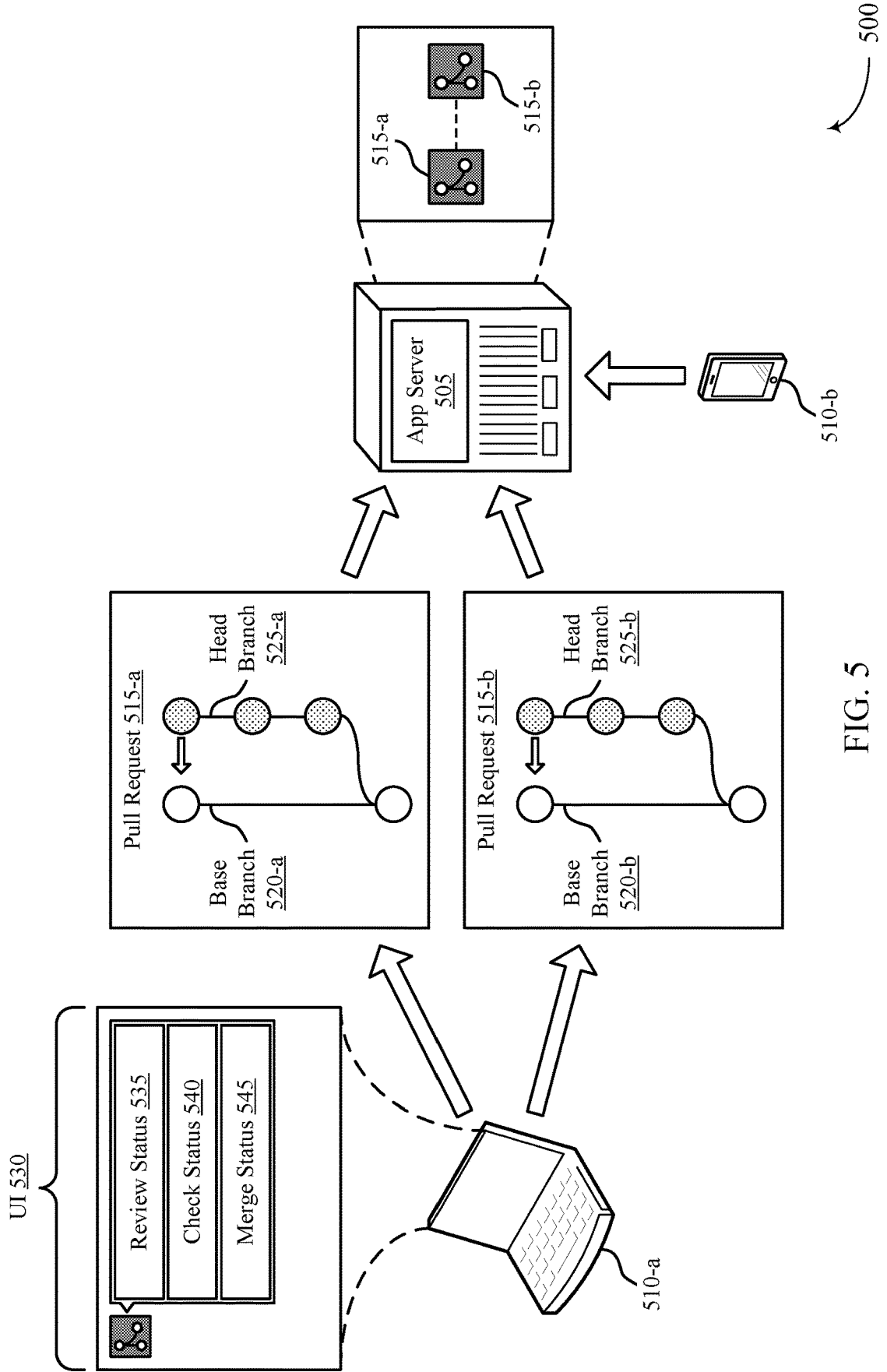
FIG. 5 illustrates an example of a pull request handling procedure that supports joint validation across code repositories in accordance with aspects of the present disclosure.

FIG. 5 illustrates an example of a pull request handling procedure 500 that supports joint validation across code repositories in accordance with aspects of the present disclosure. The pull request handling procedure 500 may be performed by an application server 505, which may be an example of the corresponding device as described with reference to FIGS. 2 through 4. The application server 505 may receive one or more pull requests 515, link the pull requests 515, and support a user interface 530 for viewing, revising, and validating the pull requests 515.

A user device 510-a may submit changes in multiple code repositories. These changes may be examples of correlated changes, as the code updates correspond to fixing a problem or adding functionality spanning across multiple code repositories. The user device 510-a may create pull requests 515 for the changes. For example, pull request 515-a may correspond to a change in a first code repository and pull request 515-b may correspond to a correlated change in a second code repository. This correlation of changes may be based on the branch names. For example, pull request 515-a may indicate a base branch 520-a and a head branch 525-a with which to update the base branch 520-a. Likewise, pull request 515-b may indicate a base branch 520-b and a head branch 525-b with which to update the base branch 520-b. The application server 505 may correlate (i.e., link) the pull requests 515-a and 515-b based on the head branches 525-a and 525-b having the same branch name (e.g., in different code repositories). Additionally or alternatively, the application server 505 may correlate pull requests 515 by commit name, commit information, NLP analysis, or any other identifier or indication across code repositories. The application server 505 may trigger the linking process when a pull request 515 is opened or reopened and may link the pull request 515 with any other open pull requests 515 (e.g., supporting the linking of any number of pull requests 515).

The application server 505 may support other users reviewing the pull requests 515. For example, a user operating user device 510-b may review the pull requests 515 and approve the pull requests 515 if the user does not identify issues with the changes. In some cases, the application server 505 may validate this other user belongs to an organization with valid access to the pull requests 515 (e.g., using login credentials or other securitization procedures). The current review status 535 of a pull request 515 may be displayed in a user interface 530. The application server 505 may queue joint validation of the pull requests 515 until approval by another user (e.g., a user other than the author of a pull request 515). For example, when a user opens or reopens a pull request 515, the application server 505 may create a check (i.e., a validation check) for the pull request and may mark the pull request 515 as "queued." The user interface 530 may display an indication of the check and the check status 540 of "queued." Upon approval of both linked pull requests 515, or upon a manual validation trigger prior to approval by another user, the application server 505 may run the joint validation for the linked pull requests 515. While the application server 505 generates a unique build with all of the linked pull requests currently open (e.g., for a given branch name) and performs the validation tests, the check status 540 (e.g., a build status) may be updated to "in progress." The check status 540 may be updated again when the build status is received (e.g., as a result of the joint validation). In some examples, the build status may be "success," "failure," or "unstable." The user interface 530 may additionally indicate other build status details, such as an amount of processing time used in order to determine the build status, information relevant to validation failures, etc. In some cases, the user interface 530 may support commands by a user to cancel or re-run a unique build procedure.

The user interface 530 may additionally display a merge status 545 for a pull request 515. For example, if the pull request 515 has not yet passed joint validation, the merge status 545 may indicate that merging is blocked. Once the pull request 515 is approved by another user and passes the joint validation, the merge status 545 may update to indicate that merging is no longer blocked. In some cases, once merging is no longer blocked, the application server 505 may automatically trigger the corresponding merge in the codebase.

Figure 6:
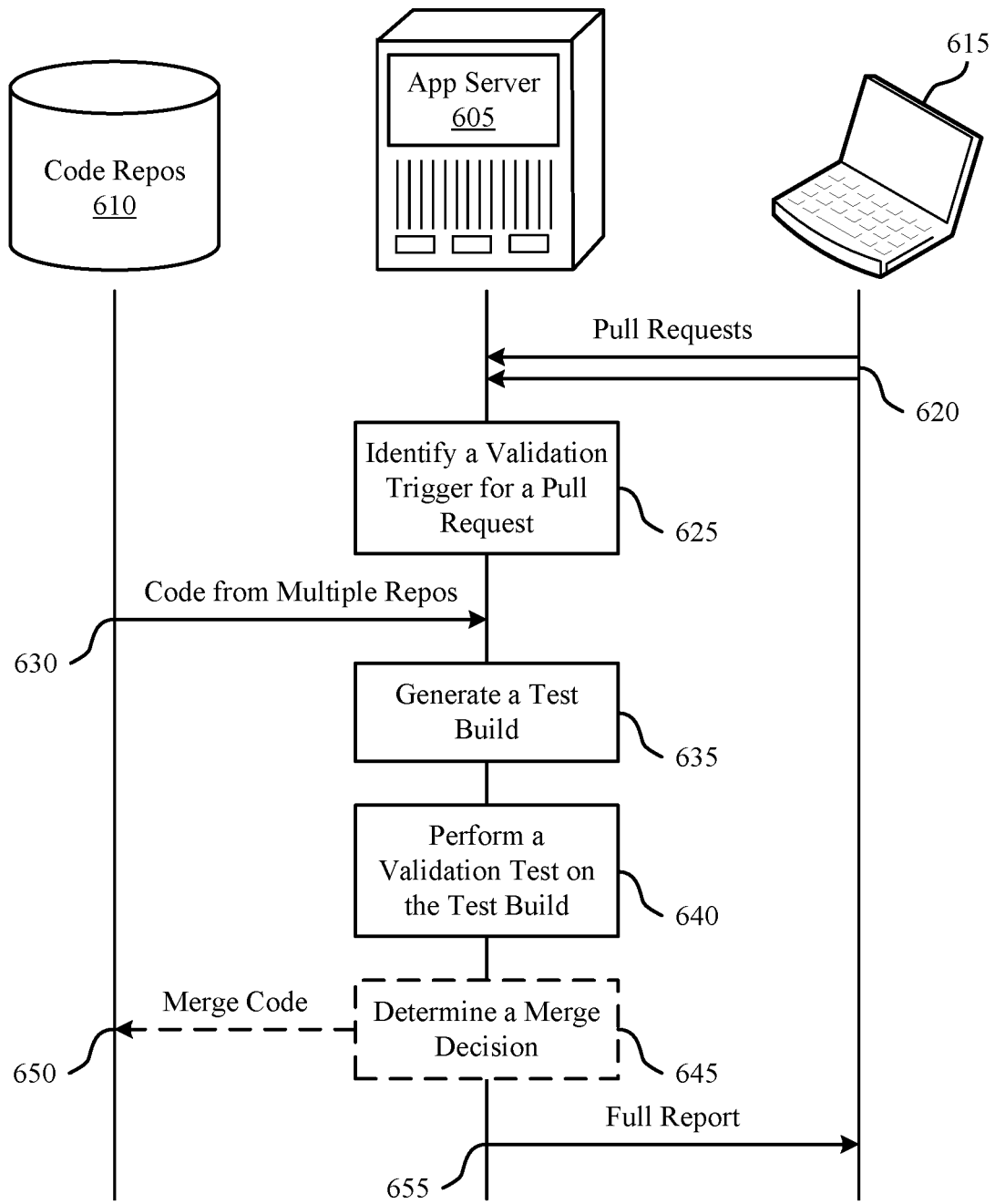
FIG. 6 illustrates an example of a process flow that supports joint validation across code repositories in accordance with aspects of the present disclosure.

FIG. 6 illustrates an example of a process flow 600 that supports joint validation across code repositories in accordance with aspects of the present disclosure. The process flow 600 may include an application server 605 (e.g., any device or system supporting joint validation), multiple code repositories 610, and one or more user devices 615. These devices and systems may be examples of the corresponding devices and systems described with reference to FIGS. 1 through 5. Alternative examples of the following may be implemented, where some steps are performed in a different order than described or are not performed at all. In some cases, steps may include additional features not mentioned below, or further steps may be added.

At 620, a user operating a user device 615 may submit one or more pull requests. For example, the user may submit a first pull request associated with a first code repository and a second pull request associated with a second code repository, where the user is associated with (e.g., has code stored in) both of these code repositories 610. In some cases, the application server 605 may perform an initial format validation test on the pull requests submitted by user devices 615.

At 625, the application server 605 may identify a validation trigger for a pull request indicating a code update (e.g., one or more commits) for a first branch in a first code repository. In some cases, the validation trigger may involve a second user (e.g., different from the user submitting the pull request) approving the pull request. In some other cases, the validation trigger may involve a user (e.g., the user submitting the pull request) inputting a validation indication—such as a "validate" comment—for the pull request (e.g., prior to approval of the pull request by another user).

At 630, the application server 605 may determine at least a second code repository correlated with the first code repository based on the pull request, where the second code repository includes a second branch. In some cases, the application server 605 may determine a second pull request correlated with the first pull request and indicating a second code update for the second branch of the second code repository. For example, the first code update may include a first head branch of the first code repository with a first branch name, and the second code update may include a second head branch of the second code repository with a second branch name. The application server 605 may determine that the two pull requests are correlated based on the first branch name being the same as the second branch name. In some other examples, the application server 605 may determine that the two pull requests are correlated based on an NLP analysis of the first pull request, the second pull request, the first code update, the second code update, the first code repository, the second code repository, or some combination of these. In some cases, the application server 605 may determine any number of correlated code repositories, pull requests, or both. The second code repository may be correlated with the first code repository based on a portion of code in the second code repository depending on the code update for the first branch of the first code repository, a portion of code in the first code repository depending on code in the second code repository, or both.

The application server 605 may retrieve code from the code repositories 610 for the validation procedure. For example, the application server 605 may retrieve, via an API, the first branch of the first code repository, the second branch of the second code repository, the code update indicated by the first pull request, the second code update indicated by the second pull request, or a combination thereof based on determining the correlation between the pull requests, the code repositories, or both. In some examples, retrieving the code may involve cloning code, checking out branches, or the like.

At 635, the application server 605 may generate a test build based on the validation trigger. The test build may include the first branch of the first code repository and the second branch of the second code repository. The application server 605 may update the first branch according to the code update for the first pull request. Additionally, the application server 605 may update the second branch according to the second code update for the second pull request (e.g., if a second linked pull request is identified).

At 640, the application server 605 may perform a validation test on the test build for the first code repository and the second code repository. In some cases, the application server 605 may assign the same validation result to all of the correlated pull requests based on the validation test. For example, if the validation test fails for at least one pull request, the application server 605 may assign a failure result to all of the correlated pull requests. However, if the validation test passes for all of the correlated pull requests, the application server 605 may assign a success result to all of these pull requests.

At 645, the application server 605 may determine a merge decision for the pull request(s) based on the validation test.

In one example, the application server 605 may determine a success result for the validation test based on the test build. In such an example, at 650, the application server 605 may merge the code update with the first branch of the first code repository based on the success result. The application server 605 may additionally merge any code updates for correlated pull requests with the corresponding branches of the other code repositories based on the success result.

In another example, the application server 605 may determine a failure result, an unstable result, or both for the validation test based on the test build and may refrain from merging the code update with the first branch of the first code repository—and, if a second, correlated pull request is identified, refrain from merging the second code update with the second branch of the second code repository—based on the failure result, the unstable result, or both. In such an example, at 655, the application server 605 may send, for display in a user interface of a user device 615, a full report indicating the failure result, the unstable result, or both for the first code repository and the second code repository. For example, the full report may indicate a specific failed test, a specific line of code that failed to compile, or a combination thereof.

Figure 7:
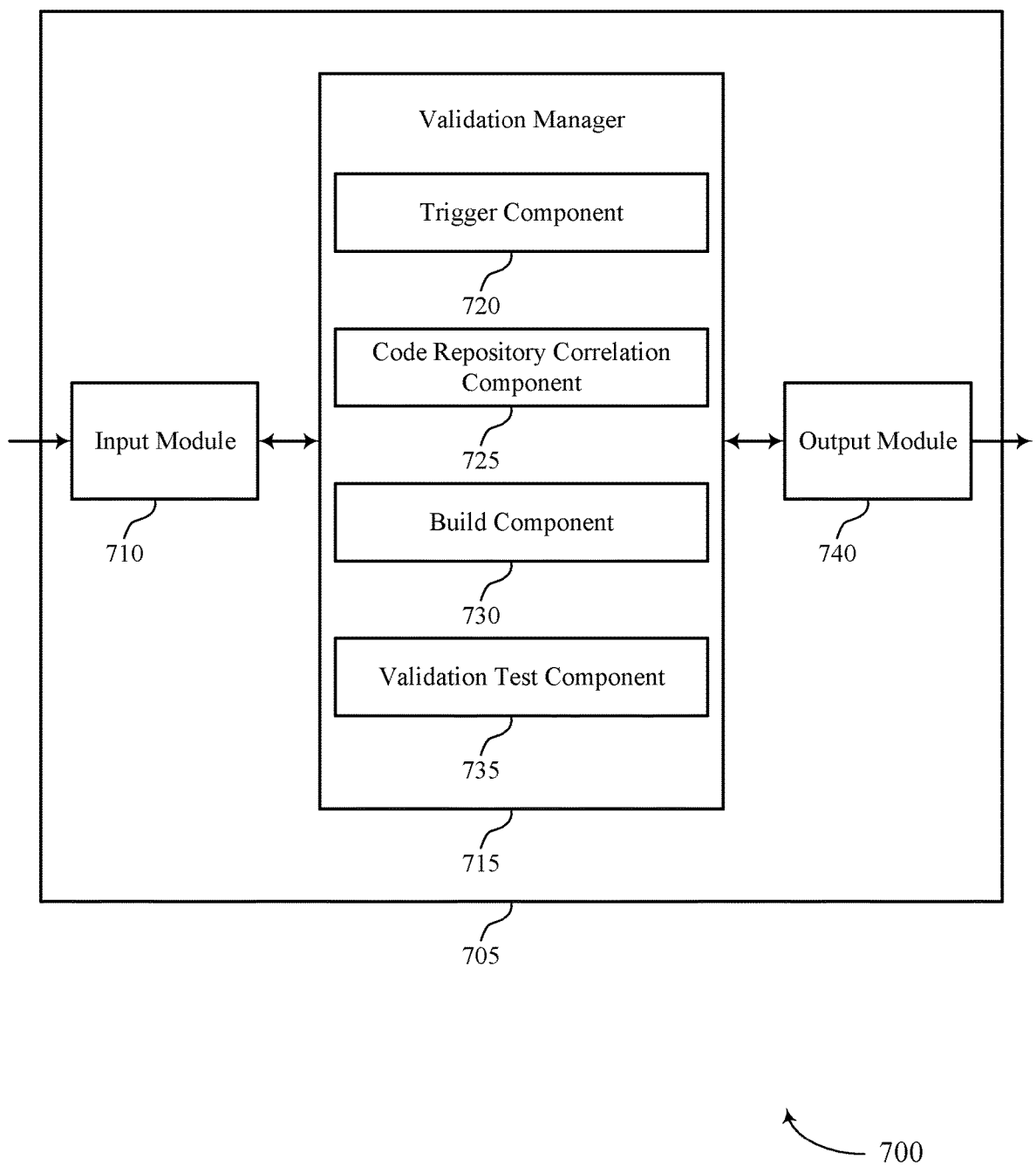
FIG. 7 shows a block diagram of an apparatus that supports joint validation across code repositories in accordance with aspects of the present disclosure.

FIG. 7 shows a block diagram 700 of an apparatus 705 that supports joint validation across code repositories in accordance with aspects of the present disclosure. The apparatus 705 may include an input module 710, a validation manager 715, and an output module 740. The apparatus 705 may also include a processor. Each of these components may be in communication with one another (e.g., via one or more buses). In some cases, the apparatus 705 may be an example of a user terminal, a database server, or a system containing multiple computing devices.

The input module 710 may manage input signals for the apparatus 705. For example, the input module 710 may identify input signals based on an interaction with a modem, a keyboard, a mouse, a touchscreen, or a similar device. These input signals may be associated with user input or processing at other components or devices. In some cases, the input module 710 may utilize an operating system such as iOS®, ANDROID®, MS-DOS®, MS-WINDOWS®, OS/2®, UNIX®, LINUX®, or another known operating system to handle input signals. The input module 710 may send aspects of these input signals to other components of the apparatus 705 for processing. For example, the input module 710 may transmit input signals to the validation manager 715 to support joint validation across code repositories. In some cases, the input module 710 may be a component of an input/output (I/O) controller 915 as described with reference to FIG. 9.

The validation manager 715 may include a trigger component 720, a code repository correlation component 725, a build component 730, and a validation test component 735. The validation manager 715 may be an example of aspects of the validation manager 805 or 910 described with reference to FIGS. 8 and 9.

The validation manager 715 and/or at least some of its various sub-components may be implemented in hardware, software executed by a processor, firmware, or any combination thereof. If implemented in software executed by a processor, the functions of the validation manager 715 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The validation manager 715 and/or at least some of its various sub-components may be physically located at various positions, including being distributed such that portions of functions are implemented at different physical locations by one or more physical devices. In some examples, the validation manager 715 and/or at least some of its various sub-components may be a separate and distinct component in accordance with various aspects of the present disclosure. In other examples, the validation manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The trigger component 720 may identify a validation trigger for a pull request indicating a code update for a first branch of a first code repository. The code repository correlation component 725 may determine at least a second code repository correlated with the first code repository based on the pull request, where the second code repository includes a second branch. The build component 730 may generate a test build including the first branch of the first code repository updated according to the code update and the second branch of the second code repository based on the validation trigger. The validation test component 735 may perform a validation test on the test build for the first code repository and the second code repository.

The output module 740 may manage output signals for the apparatus 705. For example, the output module 740 may receive signals from other components of the apparatus 705, such as the validation manager 715, and may transmit these signals to other components or devices. In some specific examples, the output module 740 may transmit output signals for display in a user interface, for storage in a database or data store, for further processing at a server or server cluster, or for any other processes at any number of devices or systems. In some cases, the output module 740 may be a component of an I/O controller 915 as described with reference to FIG. 9.

Figure 8:
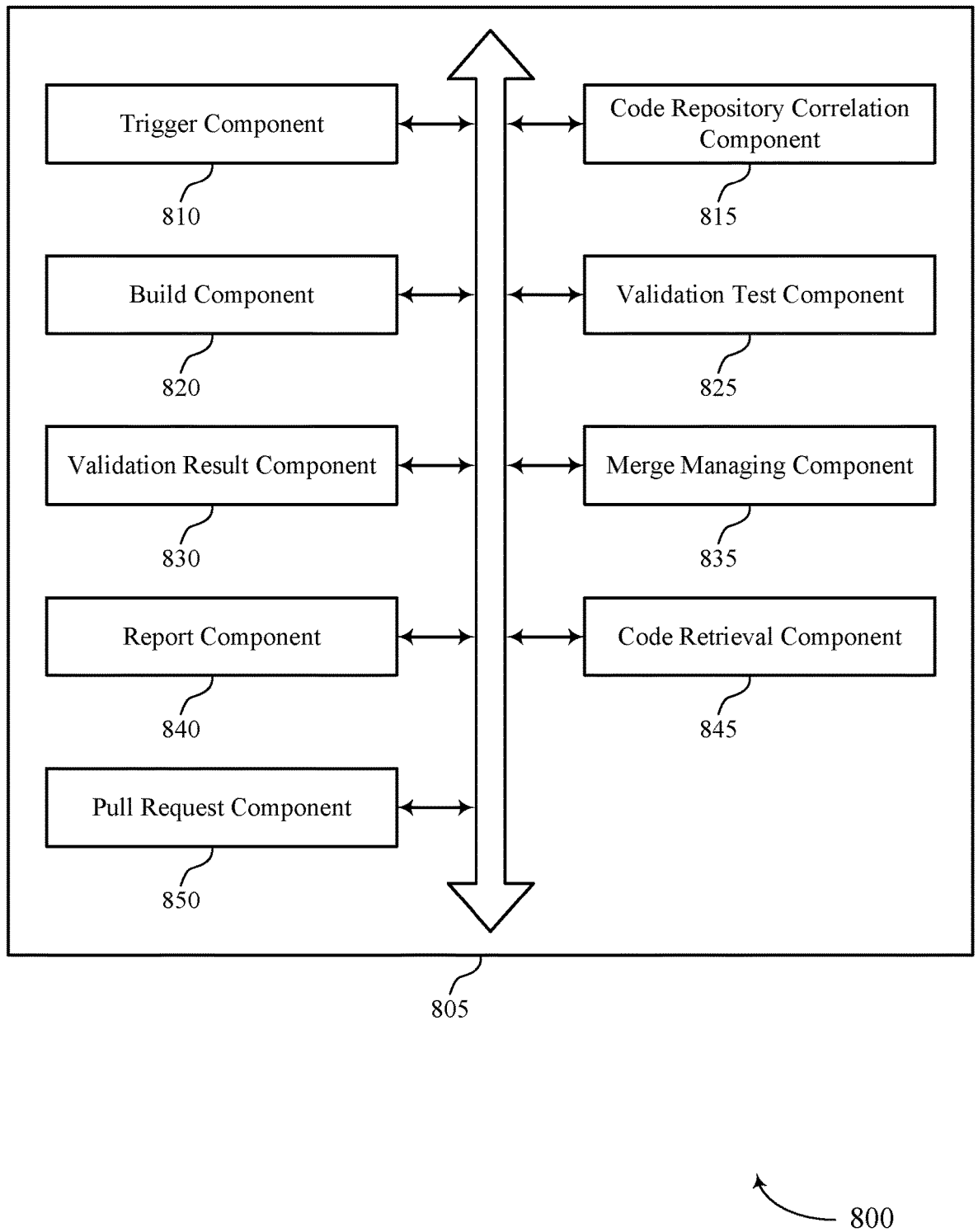
FIG. 8 shows a block diagram of a validation manager that supports joint validation across code repositories in accordance with aspects of the present disclosure.

FIG. 8 shows a block diagram 800 of a validation manager 805 that supports joint validation across code repositories in accordance with aspects of the present disclosure. The validation manager 805 may be an example of aspects of a validation manager 715 or a validation manager 910 described herein. The validation manager 805 may include a trigger component 810, a code repository correlation component 815, a build component 820, a validation test component 825, a validation result component 830, a merge managing component 835, a report component 840, a code retrieval component 845, and a pull request component 850. Each of these modules may communicate, directly or indirectly, with one another (e.g., via one or more buses).

The trigger component 810 may identify a validation trigger for a pull request indicating a code update for a first branch of a first code repository. The code repository correlation component 815 may determine at least a second code repository correlated with the first code repository based on the pull request, where the second code repository includes a second branch. In some cases, at least the second code repository is determined to be correlated with the first code repository based on at least a portion of code in the second code repository depending on the code update for the first branch of the first code repository.

In some cases, the pull request is created by a first user associated with the first code repository and the second code repository, and the validation trigger includes approval of the pull request by a second user different from the first user and associated with the first code repository and the second code repository. In some other cases, the pull request is created by a first user associated with the first code repository and the second code repository, and the validation trigger includes a validation indication input by the first user.

The build component 820 may generate a test build including the first branch of the first code repository updated according to the code update and the second branch of the second code repository based on the validation trigger. The validation test component 825 may perform a validation test on the test build for the first code repository and the second code repository.

In some examples, the pull request is a first pull request and the code update is a first code update. In some such examples, the code repository correlation component 815 may determine a second pull request correlated with the first pull request and indicating a second code update for the second branch of the second code repository, where the test build includes the second branch of the second code repository updated according to the second code update. In some cases, the first code update includes a first head branch of the first code repository with a first branch name, and the second code update includes a second head branch of the second code repository with a second branch name, where the second pull request is determined to be correlated with the first pull request based on the first branch name being the same as the second branch name. In some cases, the second pull request is determined to be correlated with the first pull request based on an NLP analysis of the first pull request, the second pull request, the first code update, the second code update, the first code repository, the second code repository, or a combination thereof. In some examples, the validation result component 830 may assign a same validation result to both the first pull request and the second pull request based on the validation test.

In some examples, the validation result component 830 may determine a failure result, an unstable result, or both for the validation test based on the test build. In some such examples, the merge managing component 835 may refrain from merging the code update with the first branch of the first code repository based on the failure result, the unstable result, or both. The report component 840 may send, for display in a user interface, a full report indicating the failure result, the unstable result, or both for the first code repository and the second code repository. In some cases, the full report indicates a specific failed test, a specific line of code that failed to compile, or a combination thereof.

In some other examples, the validation result component 830 may determine a success result for the validation test based on the test build. In some such examples, the merge managing component 835 may merge the code update with the first branch of the first code repository based on the success result.

In some examples, the merge managing component 835 may block a merge of the code update with the first branch of the first code repository until a success result is determined for the validation test.

The code retrieval component 845 may retrieve, via an API, the first branch of the first code repository, the second branch of the second code repository, and the code update based on the determining, where generating the test build is based on the retrieving.

The pull request component 850 may identify submission of the pull request by a user and may perform an initial format validation test on the pull request based on the submission.

In some cases, the first code repository includes a first code environment for a user, an organization, or both, and the second code repository includes a second code environment for the user, the organization, or both. In some cases, each branch of the first code repository includes a respective first isolated portion of code in the first code environment for development by the user, the organization, or both, and each branch of the second code repository includes a respective second isolated portion of code in the second code environment for development by the user, the organization, or both.

Figure 9:
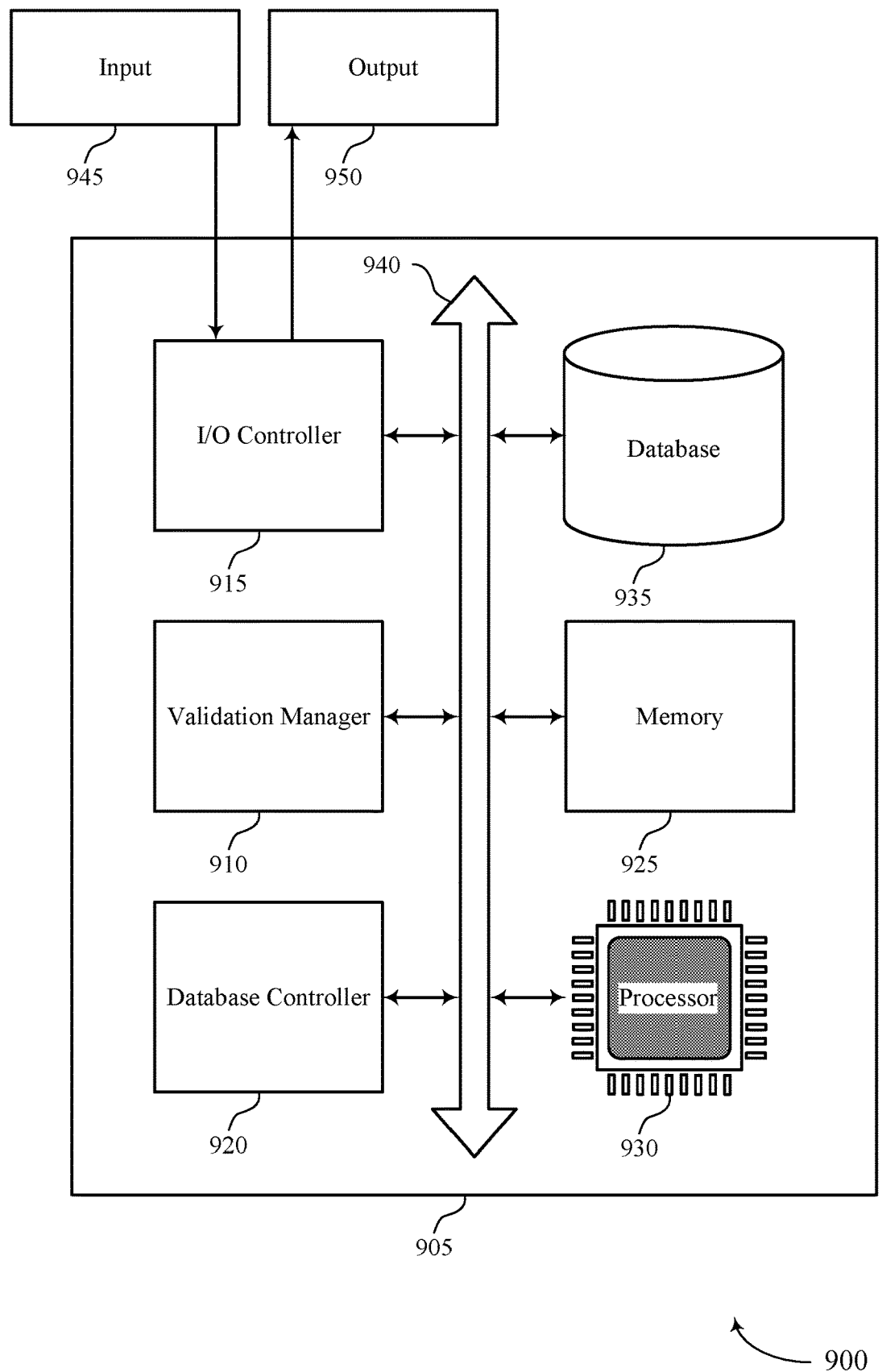
FIG. 9 shows a diagram of a system including a device that supports joint validation across code repositories in accordance with aspects of the present disclosure.

FIG. 9 shows a diagram of a system 900 including a device 905 that supports joint validation across code repositories in accordance with aspects of the present disclosure. The device 905 may be an example of or include the components of an application server or an apparatus 705 as described herein. The device 905 may include components for bi-directional data communications including components for transmitting and receiving communications, including a validation manager 910, an I/O controller 915, a database controller 920, memory 925, a processor 930, and a database 935. These components may be in electronic communication via one or more buses (e.g., bus 940).

The validation manager 910 may be an example of a validation manager 715 or 805 as described herein. For example, the validation manager 910 may perform any of the methods or processes described above with reference to FIGS. 7 and 8. In some cases, the validation manager 910 may be implemented in hardware, software executed by a processor, firmware, or any combination thereof.

The I/O controller 915 may manage input signals 945 and output signals 950 for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The database controller 920 may manage data storage and processing in a database 935. In some cases, a user may interact with the database controller 920. In other cases, the database controller 920 may operate automatically without user interaction. The database 935 may be an example of a single database, a distributed database, multiple distributed databases, a data store, a data lake, or an emergency backup database.

Memory 925 may include random-access memory (RAM) and read-only memory (ROM). The memory 925 may store computer-readable, computer-executable software including instructions that, when executed, cause the processor to perform various functions described herein. In some cases, the memory 925 may contain, among other things, a basic I/O system (BIOS) which may control basic hardware or software operation such as the interaction with peripheral components or devices.

The processor 930 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 930 may be configured to operate a memory array using a memory controller. In other cases, a memory controller may be integrated into the processor 930. The processor 930 may be configured to execute computer-readable instructions stored in a memory 925 to perform various functions (e.g., functions or tasks supporting joint validation across code repositories).

Figure 10:
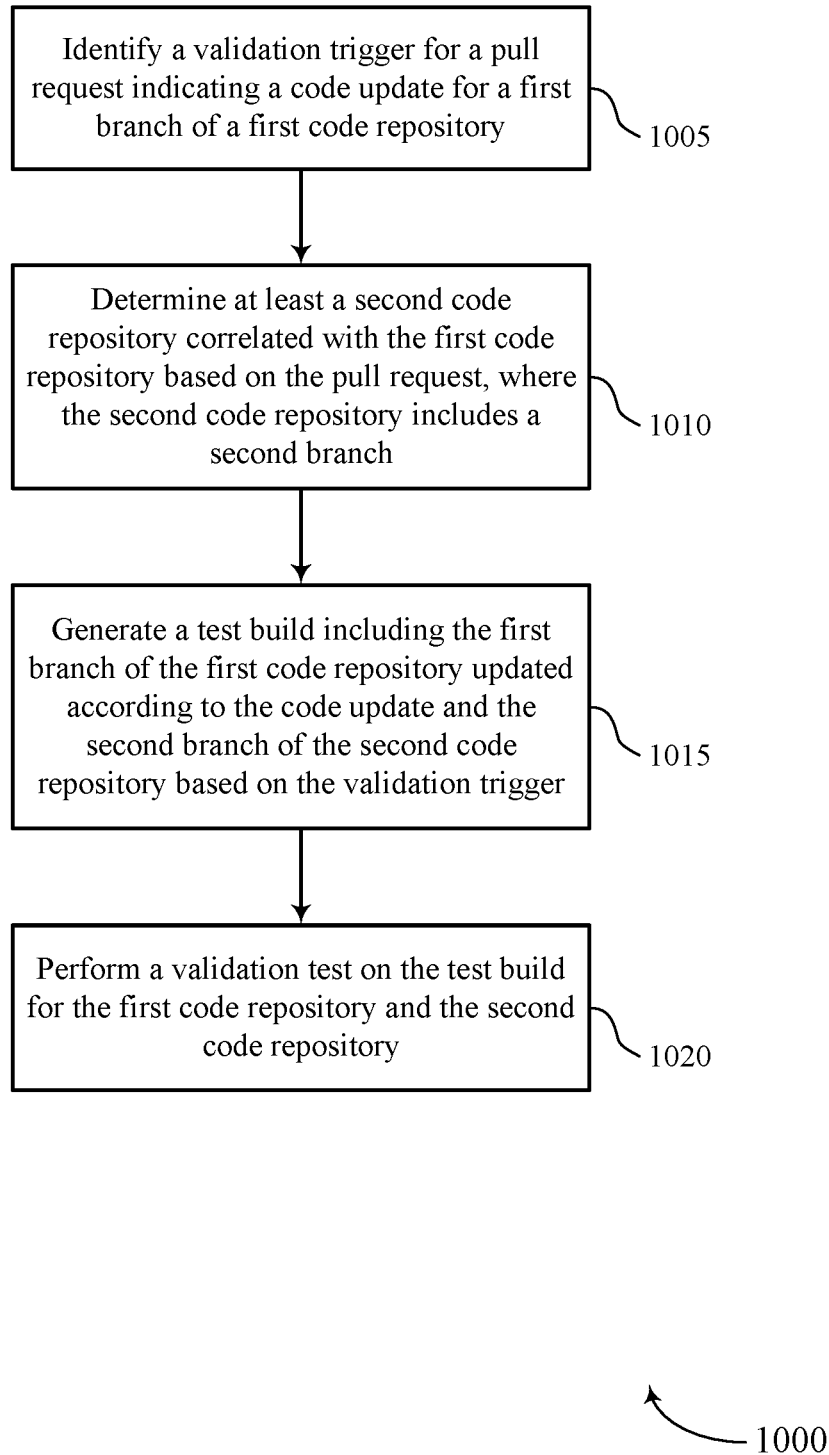
FIGS. 10 through 13 show flowcharts illustrating methods that support joint validation across code repositories in accordance with aspects of the present disclosure.

FIG. 10 shows a flowchart illustrating a method 1000 that supports joint validation across code repositories in accordance with aspects of the present disclosure. The operations of method 1000 may be implemented by an application server or its components as described herein. For example, the operations of method 1000 may be performed by a validation manager as described with reference to FIGS. 7 through 9. In some examples, an application server may execute a set of instructions to control the functional elements of the application server to perform the functions described below. Additionally or alternatively, an application server may perform aspects of the functions described below using special-purpose hardware.

At 1005, the application server may identify a validation trigger for a pull request indicating a code update for a first branch of a first code repository. The operations of 1005 may be performed according to the methods described herein. In some examples, aspects of the operations of 1005 may be performed by a trigger component as described with reference to FIGS. 7 through 9.

At 1010, the application server may determine at least a second code repository correlated with the first code repository based on the pull request, where the second code repository includes a second branch. The operations of 1010 may be performed according to the methods described herein. In some examples, aspects of the operations of 1010 may be performed by a code repository correlation component as described with reference to FIGS. 7 through 9.

At 1015, the application server may generate a test build including the first branch of the first code repository updated according to the code update and the second branch of the second code repository based on the validation trigger. The operations of 1015 may be performed according to the methods described herein. In some examples, aspects of the operations of 1015 may be performed by a build component as described with reference to FIGS. 7 through 9.

At 1020, the application server may perform a validation test on the test build for the first code repository and the second code repository. The operations of 1020 may be performed according to the methods described herein. In some examples, aspects of the operations of 1020 may be performed by a validation test component as described with reference to FIGS. 7 through 9.

Figure 11:
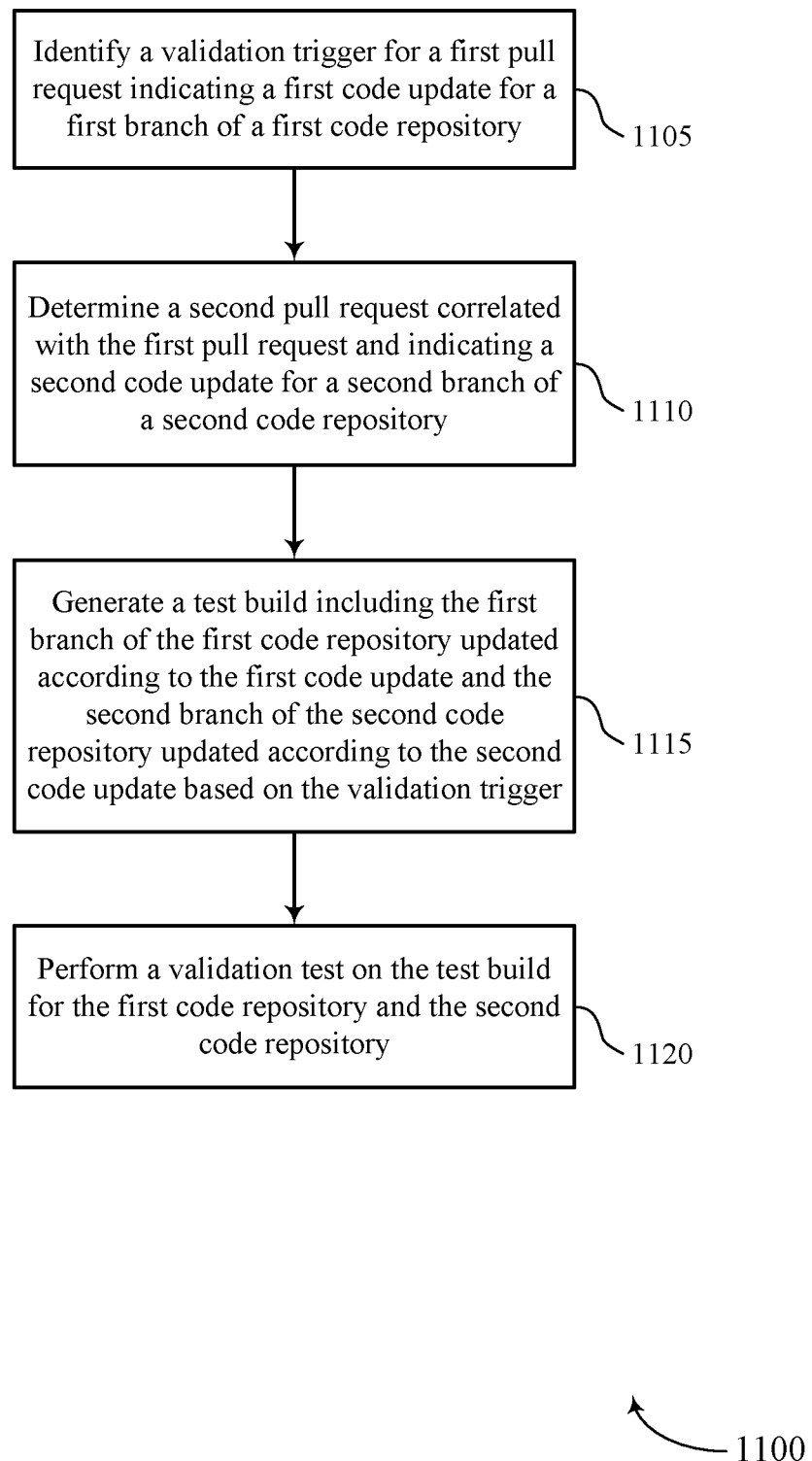

FIG. 11 shows a flowchart illustrating a method 1100 that supports joint validation across code repositories in accordance with aspects of the present disclosure. The operations of method 1100 may be implemented by an application server or its components as described herein. For example, the operations of method 1100 may be performed by a validation manager as described with reference to FIGS. 7 through 9. In some examples, an application server may execute a set of instructions to control the functional elements of the application server to perform the functions described below. Additionally or alternatively, an application server may perform aspects of the functions described below using special-purpose hardware.

At 1105, the application server may identify a validation trigger for a first pull request indicating a first code update for a first branch of a first code repository. The operations of 1105 may be performed according to the methods described herein. In some examples, aspects of the operations of 1105 may be performed by a trigger component as described with reference to FIGS. 7 through 9.

At 1110, the application server may determine a second pull request correlated with the first pull request and indicating a second code update for a second branch of a second code repository. The operations of 1110 may be performed according to the methods described herein. In some examples, aspects of the operations of 1110 may be performed by a code repository correlation component as described with reference to FIGS. 7 through 9.

At 1115, the application server may generate a test build, based on the validation trigger, including the first branch of the first code repository updated according to the first code update and the second branch of the second code repository updated according to the second code update. The operations of 1115 may be performed according to the methods described herein. In some examples, aspects of the operations of 1115 may be performed by a build component as described with reference to FIGS. 7 through 9.

At 1120, the application server may perform a validation test on the test build for the first code repository and the second code repository. The operations of 1120 may be performed according to the methods described herein. In some examples, aspects of the operations of 1120 may be performed by a validation test component as described with reference to FIGS. 7 through 9.

Figure 12:
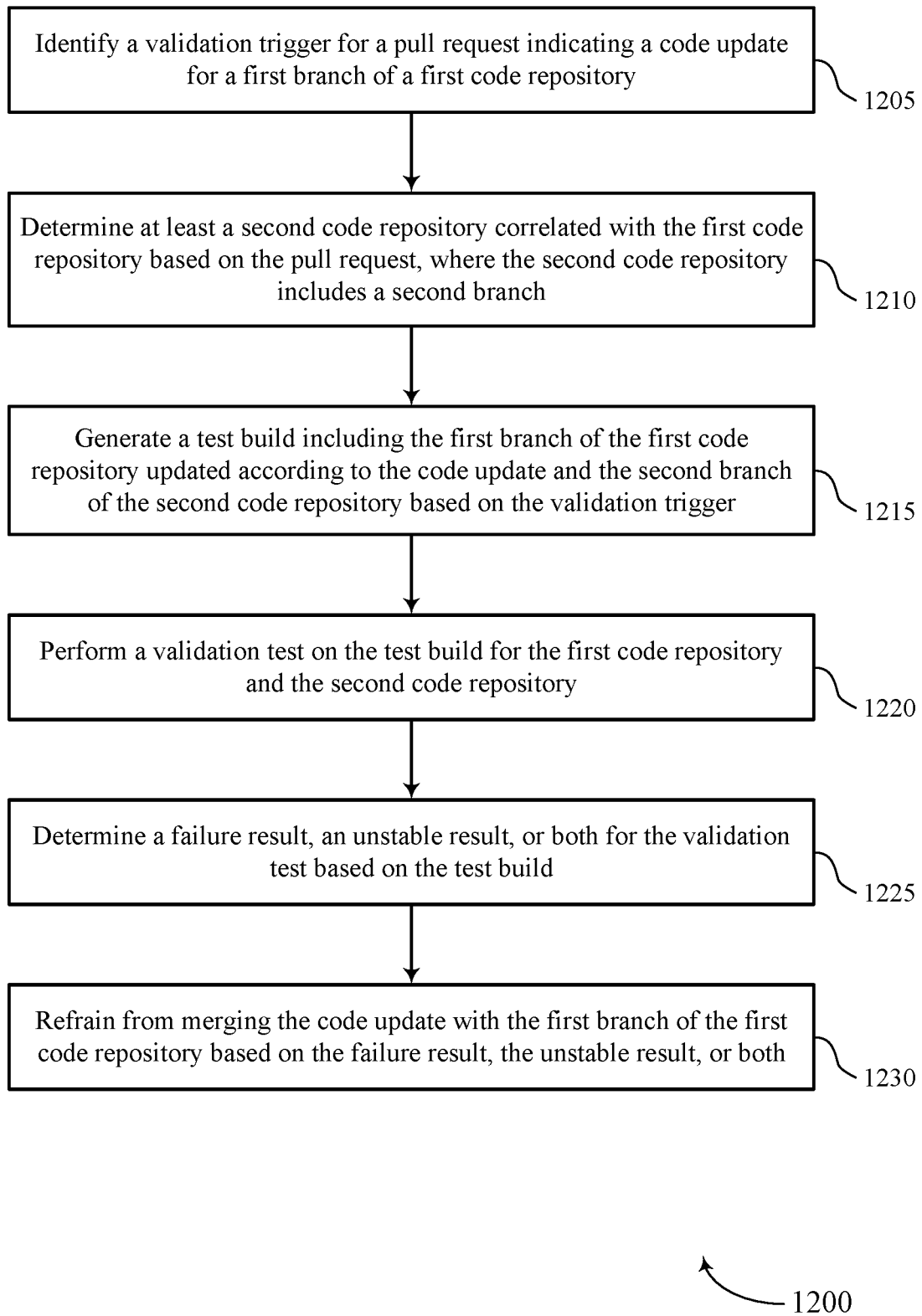

FIG. 12 shows a flowchart illustrating a method 1200 that supports joint validation across code repositories in accordance with aspects of the present disclosure. The operations of method 1200 may be implemented by an application server or its components as described herein. For example, the operations of method 1200 may be performed by a validation manager as described with reference to FIGS. 7 through 9. In some examples, an application server may execute a set of instructions to control the functional elements of the application server to perform the functions described below. Additionally or alternatively, an application server may perform aspects of the functions described below using special-purpose hardware.

At 1205, the application server may identify a validation trigger for a pull request indicating a code update for a first branch of a first code repository. The operations of 1205 may be performed according to the methods described herein. In some examples, aspects of the operations of 1205 may be performed by a trigger component as described with reference to FIGS. 7 through 9.

At 1210, the application server may determine at least a second code repository correlated with the first code repository based on the pull request, where the second code repository includes a second branch. The operations of 1210 may be performed according to the methods described herein. In some examples, aspects of the operations of 1210 may be performed by a code repository correlation component as described with reference to FIGS. 7 through 9.

At 1215, the application server may generate a test build including the first branch of the first code repository updated according to the code update and the second branch of the second code repository based on the validation trigger. The operations of 1215 may be performed according to the methods described herein. In some examples, aspects of the operations of 1215 may be performed by a build component as described with reference to FIGS. 7 through 9.

At 1220, the application server may perform a validation test on the test build for the first code repository and the second code repository. The operations of 1220 may be performed according to the methods described herein. In some examples, aspects of the operations of 1220 may be performed by a validation test component as described with reference to FIGS. 7 through 9.

At 1225, the application server may determine a failure result, an unstable result, or both for the validation test based on the test build. The operations of 1225 may be performed according to the methods described herein. In some examples, aspects of the operations of 1225 may be performed by a validation result component as described with reference to FIGS. 7 through 9.

At 1230, the application server may refrain from merging the code update with the first branch of the first code repository based on the failure result, the unstable result, or both. The operations of 1230 may be performed according to the methods described herein. In some examples, aspects of the operations of 1230 may be performed by a merge managing component as described with reference to FIGS. 7 through 9.

Figure 13:
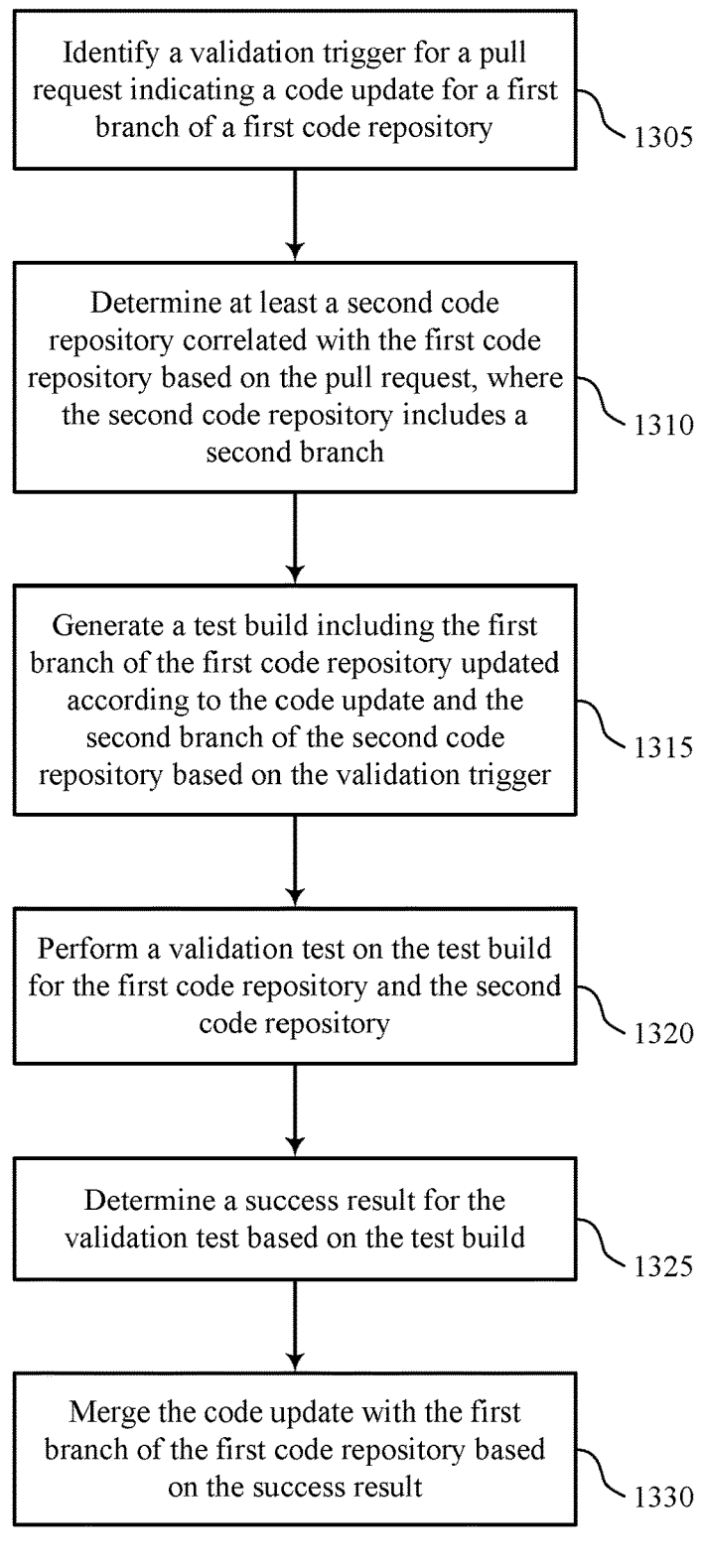

FIG. 13 shows a flowchart illustrating a method 1300 that supports joint validation across code repositories in accordance with aspects of the present disclosure. The operations of method 1300 may be implemented by an application server or its components as described herein. For example, the operations of method 1300 may be performed by a validation manager as described with reference to FIGS. 7 through 9. In some examples, an application server may execute a set of instructions to control the functional elements of the application server to perform the functions described below. Additionally or alternatively, an application server may perform aspects of the functions described below using special-purpose hardware.

At 1305, the application server may identify a validation trigger for a pull request indicating a code update for a first branch of a first code repository. The operations of 1305 may be performed according to the methods described herein. In some examples, aspects of the operations of 1305 may be performed by a trigger component as described with reference to FIGS. 7 through 9.

At 1310, the application server may determine at least a second code repository correlated with the first code repository based on the pull request, where the second code repository includes a second branch. The operations of 1310 may be performed according to the methods described herein. In some examples, aspects of the operations of 1310 may be performed by a code repository correlation component as described with reference to FIGS. 7 through 9.

At 1315, the application server may generate a test build including the first branch of the first code repository updated according to the code update and the second branch of the second code repository based on the validation trigger. The operations of 1315 may be performed according to the methods described herein. In some examples, aspects of the operations of 1315 may be performed by a build component as described with reference to FIGS. 7 through 9.

At 1320, the application server may perform a validation test on the test build for the first code repository and the second code repository. The operations of 1320 may be performed according to the methods described herein. In some examples, aspects of the operations of 1320 may be performed by a validation test component as described with reference to FIGS. 7 through 9.

At 1325, the application server may determine a success result for the validation test based on the test build. The operations of 1325 may be performed according to the methods described herein. In some examples, aspects of the operations of 1325 may be performed by a validation result component as described with reference to FIGS. 7 through 9.

At 1330, the application server may merge the code update with the first branch of the first code repository based on the success result. The operations of 1330 may be performed according to the methods described herein. In some examples, aspects of the operations of 1330 may be performed by a merge managing component as described with reference to FIGS. 7 through 9.

A method for software validation is described. The method may include identifying a validation trigger for a pull request indicating a code update for a first branch of a first code repository, determining at least a second code repository correlated with the first code repository based on the pull request, where the second code repository includes a second branch, generating a test build including the first branch of the first code repository updated according to the code update and the second branch of the second code repository based on the validation trigger, and performing a validation test on the test build for the first code repository and the second code repository.

An apparatus for software validation is described. The apparatus may include a processor, memory coupled with the processor, and instructions stored in the memory. The instructions may be executable by the processor to cause the apparatus to identify a validation trigger for a pull request indicating a code update for a first branch of a first code repository, determine at least a second code repository correlated with the first code repository based on the pull request, where the second code repository includes a second branch, generate a test build including the first branch of the first code repository updated according to the code update and the second branch of the second code repository based on the validation trigger, and perform a validation test on the test build for the first code repository and the second code repository.

Another apparatus for software validation is described. The apparatus may include means for identifying a validation trigger for a pull request indicating a code update for a first branch of a first code repository, determining at least a second code repository correlated with the first code repository based on the pull request, where the second code repository includes a second branch, generating a test build including the first branch of the first code repository updated according to the code update and the second branch of the second code repository based on the validation trigger, and performing a validation test on the test build for the first code repository and the second code repository.

A non-transitory computer-readable medium storing code for software validation is described. The code may include instructions executable by a processor to identify a validation trigger for a pull request indicating a code update for a first branch of a first code repository, determine at least a second code repository correlated with the first code repository based on the pull request, where the second code repository includes a second branch, generate a test build including the first branch of the first code repository updated according to the code update and the second branch of the second code repository based on the validation trigger, and perform a validation test on the test build for the first code repository and the second code repository.

In some examples of the method, apparatuses, and non-transitory computer-readable medium described herein, the pull request may be a first pull request and the code update may be a first code update. Some examples of the method, apparatuses, and non-transitory computer-readable medium described herein may further include operations, features, means, or instructions for determining a second pull request correlated with the first pull request and indicating a second code update for the second branch of the second code repository, where the test build includes the second branch of the second code repository updated according to the second code update.

In some examples of the method, apparatuses, and non-transitory computer-readable medium described herein, the first code update includes a first head branch of the first code repository with a first branch name, and the second code update includes a second head branch of the second code repository with a second branch name, where the second pull request is determined to be correlated with the first pull request based on the first branch name being the same as the second branch name.

In some examples of the method, apparatuses, and non-transitory computer-readable medium described herein, the second pull request may be determined to be correlated with the first pull request based on an NLP analysis of the first pull request, the second pull request, the first code update, the second code update, the first code repository, the second code repository, or a combination thereof.

Some examples of the method, apparatuses, and non-transitory computer-readable medium described herein may further include operations, features, means, or instructions for assigning a same validation result to both the first pull request and the second pull request based on the validation test.

Some examples of the method, apparatuses, and non-transitory computer-readable medium described herein may further include operations, features, means, or instructions for determining a failure result, an unstable result, or both for the validation test based on the test build and refraining from merging the code update with the first branch of the first code repository based on the failure result, the unstable result, or both.

Some examples of the method, apparatuses, and non-transitory computer-readable medium described herein may further include operations, features, means, or instructions for sending, for display in a UI, a full report indicating the failure result, the unstable result, or both for the first code repository and the second code repository.

In some examples of the method, apparatuses, and non-transitory computer-readable medium described herein, the full report indicates a specific failed test, a specific line of code that failed to compile, or a combination thereof.

Some examples of the method, apparatuses, and non-transitory computer-readable medium described herein may further include operations, features, means, or instructions for determining a success result for the validation test based on the test build and merging the code update with the first branch of the first code repository based on the success result.

Some examples of the method, apparatuses, and non-transitory computer-readable medium described herein may further include operations, features, means, or instructions for blocking a merge of the code update with the first branch of the first code repository until a success result is determined for the validation test.

Some examples of the method, apparatuses, and non-transitory computer-readable medium described herein may further include operations, features, means, or instructions for retrieving, via an API, the first branch of the first code repository, the second branch of the second code repository, and the code update based on the determining, where generating the test build may be based on the retrieving.

In some examples of the method, apparatuses, and non-transitory computer-readable medium described herein, the pull request may be created by a first user associated with the first code repository and the second code repository, and the validation trigger includes approval of the pull request by a second user different from the first user and associated with the first code repository and the second code repository.

In some examples of the method, apparatuses, and non-transitory computer-readable medium described herein, the pull request may be created by a first user associated with the first code repository and the second code repository, and the validation trigger includes a validation indication input by the first user.

In some examples of the method, apparatuses, and non-transitory computer-readable medium described herein, at least the second code repository may be determined to be correlated with the first code repository based on at least a portion of code in the second code repository depending on the code update for the first branch of the first code repository.

Some examples of the method, apparatuses, and non-transitory computer-readable medium described herein may further include operations, features, means, or instructions for identifying submission of the pull request by a user and performing an initial format validation test on the pull request based on the submission.

In some examples of the method, apparatuses, and non-transitory computer-readable medium described herein, the first code repository includes a first code environment for a user, an organization, or both, the second code repository includes a second code environment for the user, the organization, or both, each branch of the first code repository includes a respective first isolated portion of code in the first code environment for development by the user, the organization, or both, and each branch of the second code repository includes a respective second isolated portion of code in the second code environment for development by the user, the organization, or both.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for software validation, comprising:

identifying a validation trigger for a first pull request indicating a first code update comprising a first head branch for a first branch of a first code repository with a first branch name and a second pull request correlated with the first pull request and indicating a second code update comprising a second head branch for a second branch of a second code repository with a second branch name, the second pull request determined to be correlated with the first pull request based at least in part on the first branch name being the same as the second branch name, wherein identifying the validation trigger triggers a test build of code for validation, the code corresponding to the first code update for the first branch and the second code update for the second branch, and wherein the test build comprises the second branch of the second code repository updated according to the second code update;

determining at least the second code repository correlated with the first code repository based at least in part on the first pull request and the second pull request, wherein the second code repository comprises the second branch;

retrieving, via an application programming interface, the first branch of the first code repository, the second branch of the second code repository, the first code update, and the second code update based at least in part on the determining;

generating the test build of the code comprising the first branch of the first code repository updated according to the first code update and the second branch of the second code repository based at least in part on the validation trigger and the retrieving; and performing a validation test on the test build of the code in response to identifying the validation trigger.

2. The method of claim 1, wherein the second pull request is determined to be correlated with the first pull request based at least in part on a natural language processing analysis of the first pull request, the second pull request, the first code update, the second code update, the first code repository, the second code repository, or a combination thereof.

3. The method of claim 1, further comprising:

assigning a same validation result to both the first pull request and the second pull request based at least in part on the validation test.

4. The method of claim 1, further comprising:
determining a failure result, an unstable result, or both for the validation test based at least in part on the test build; and
refraining from merging the first code update and the second code update with the first branch of the first code repository based at least in part on the failure result, the unstable result, or both.

5. The method of claim 4, further comprising:
sending, for display in a user interface, a full report indicating the failure result, the unstable result, or both for the first code repository and the second code repository.

6. The method of claim 5, wherein the full report indicates a specific failed test, a specific line of code that failed to compile, or a combination thereof.

7. The method of claim 1, further comprising:
determining a success result for the validation test based at least in part on the test build; and
merging the first code update and the second code update with the first branch of the first code repository based at least in part on the success result.

8. The method of claim 1, further comprising:
blocking a merge of the first code update and the second code update with the first branch of the first code repository until a success result is determined for the validation test.

9. The method of claim 1, wherein:
the first pull request and the second pull request are created by a first user associated with the first code repository and the second code repository; and
the validation trigger comprises approval of the first pull request and the second pull request by a second user different from the first user and associated with the first code repository and the second code repository.

10. The method of claim 1, wherein:
the first pull request and the second pull request are created by a first user associated with the first code repository and the second code repository; and
the validation trigger comprises a validation indication input by the first user.

11. The method of claim 1, wherein at least the second code repository is determined to be correlated with the first code repository based at least in part on at least a portion of code in the second code repository depending on the first code update for the first branch of the first code repository.

12. The method of claim 1, further comprising:
identifying submission of the first pull request and the second pull request by a user; and
performing an initial format validation test on the first pull request and the second pull request based at least in part on the submission.

13. The method of claim 1, wherein:
the first code repository comprises a first code environment for a user, an organization, or both;
the second code repository comprises a second code environment for the user, the organization, or both;
each branch of the first code repository comprises a respective first isolated portion of code in the first code environment for development by the user, the organization, or both; and
each branch of the second code repository comprises a respective second isolated portion of code in the second code environment for development by the user, the organization, or both.

14. An apparatus for software validation, comprising:
a processor;
memory coupled with the processor; and
instructions stored in the memory and executable by the processor to cause the apparatus to:
identify a validation trigger for a first pull request indicating a first code update comprising a first head branch for a first branch of a first code repository with a first branch name and a second pull request correlated with the first pull request and indicating a second code update comprising a second head branch for a second branch of a second code repository with a second branch name, the second pull request determined to be correlated with the first pull request based at least in part on the first branch name being the same as the second branch name, wherein identifying the validation trigger triggers a test build of code for validation, the code corresponding to the first code update for the first branch and the second code update for the second branch, and wherein the test build comprises the second branch of the second code repository updated according to the second code update;
determine at least the second code repository correlated with the first code repository based at least in part on the first pull request and the second pull request, wherein the second code repository comprises the second branch;
retrieve, via an application programming interface, the first branch of the first code repository, the second branch of the second code repository, the first code update, and the second code update based at least in part on the determining;
generate the test build of the code comprising the first branch of the first code repository updated according to the first code update and the second branch of the second code repository based at least in part on the validation trigger and the retrieving; and
perform a validation test on the test build of the code in response to identifying the validation trigger.

15. The apparatus of claim 14, wherein the instructions are further executable by the processor to cause the apparatus to:
assign a same validation result to both the first pull request and the second pull request based at least in part on the validation test.

16. A non-transitory computer-readable medium storing code for software validation, the code comprising instructions executable by a processor to:
identify a validation trigger for a first pull request indicating a first code update comprising a first head branch for a first branch of a first code repository with a first branch name and a second pull request correlated with the first pull request and indicating a second code update comprising a second head branch for a second branch of a second code repository with a second branch name, the second pull request determined to be correlated with the first pull request based at least in part on the first branch name being the same as the second branch name, wherein identifying the validation trigger triggers a test build of code for validation, the code corresponding to the first code update for the first branch and the second code update for the second branch, and wherein the test build comprises the second branch of the second code repository updated according to the second code update;
determine at least the second code repository correlated with the first code repository based at least in part on the first pull request and the second pull request, wherein the second code repository comprises the second branch;

retrieve, via an application programming interface, the first branch of the first code repository, the second branch of the second code repository, the first code update, and the second code update based at least in part on the determining;

generate the test build of the code comprising the first branch of the first code repository updated according to the first code update and the second branch of the second code repository based at least in part on the validation trigger and the retrieving; and perform a validation test on the test build of the code in response to identifying the validation trigger.

* * * * *